US012266244B2

(12) United States Patent
Shore et al.

(10) Patent No.: US 12,266,244 B2
(45) Date of Patent: *Apr. 1, 2025

(54) LOCATION-BASED WAGERING VIA REMOTE DEVICES

(71) Applicant: MICRO-GAMING VENTURES, LLC, Dallas, TX (US)

(72) Inventors: Michael W. Shore, Dallas, TX (US); Afonso G. Chan, Colleyville, TX (US); Luis M. Ortiz, Albuquerque, NM (US); Kermit D. Lopez, Albuquerque, NM (US)

(73) Assignee: Micro-Gaming Ventures, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,599

(22) Filed: Jan. 24, 2021

(65) Prior Publication Data

US 2021/0217279 A1 Jul. 15, 2021

Related U.S. Application Data

(63) Continuation of application No. 15/218,311, filed on Jul. 25, 2016, now Pat. No. 10,916,103, which is a (Continued)

(51) Int. Cl.
*G07F 17/32* (2006.01)

(52) U.S. Cl.
CPC ...... *G07F 17/3288* (2013.01); *G07F 17/3211* (2013.01); *G07F 17/3218* (2013.01); *G07F 17/3223* (2013.01); *G07F 17/3237* (2013.01); *G07F 17/3241* (2013.01); *G07F 17/3244* (2013.01); *G07F 17/3248* (2013.01)

(58) Field of Classification Search
None
See application file for complete search history.

(56) References Cited

U.S. PATENT DOCUMENTS

| | | | |
|---|---|---|---|
| 5,687,968 | A | 11/1997 | Tarantino |
| 6,508,710 | B1 | 1/2003 | Paravia et al. |

(Continued)

OTHER PUBLICATIONS

U.S. Appl. No. 12/944,394; Information Disclosure Statement(s) and Notices of References Cited.

(Continued)

*Primary Examiner* — Jason T Yen
(74) *Attorney, Agent, or Firm* — Ortiz & Lopez, PLLC; Luis M. Ortiz; Kermit D. Lopez

(57) ABSTRACT

Location based wagering method sand systems. An online wagering service can be invoked via a mobile device. A determination can then be made regarding the location of the mobile device and a jurisdiction (e.g., state, county, city, etc.) associated with that location. The mobile device and hence a user can be authorized to access the online wagering service based on the location of the mobile device. Based on the location, it can also be determined if use of the online wagering service is allowed in the jurisdiction along with prescribed limitations of use in that jurisdiction. Wagering options are then presented via the mobile device, which conform to the laws and/or regulations of the jurisdiction.

11 Claims, 14 Drawing Sheets

Related U.S. Application Data continuation of application No. 14/262,301, filed on Apr. 25, 2014, now Pat. No. 9,430,909.

(60) Provisional application No. 61/976,554, filed on Apr. 8, 2014.

(56) References Cited

U.S. PATENT DOCUMENTS 6,527,270 B2 3/2003 Maksymec et al.
6,527,638 B1 3/2003 Walker et al.
6,692,003 B2 2/2004 Potter et al.
6,935,952 B2 8/2005 Walker et al.
6,993,499 B2 1/2006 Gagnon et al.
7,209,733 B2 4/2007 Ortiz et al.
7,351,149 B1 4/2008 Simon et al.
7,379,885 B1 5/2008 Zakim
7,451,401 B2 11/2008 Tanskanen et al.
7,607,107 B2 10/2009 Iten et al.
8,057,300 B2 11/2011 Corbo
8,142,283 B2 3/2012 Lutnick et al.
8,282,488 B2 10/2012 Walker et al.
8,342,924 B2 1/2013 Leen et al.
8,414,837 B2 4/2013 Paradise et al.
8,444,470 B2 5/2013 Gurule
8,480,471 B2 7/2013 Lutnick et al.
8,540,574 B1 9/2013 Kopra
8,545,311 B2 10/2013 Shore et al.
8,632,392 B2 1/2014 Shore et al.
8,672,751 B2 3/2014 Leen et al.
8,734,231 B2 5/2014 Shore et al.
9,430,909 B2 8/2016 Shore et al.
9,483,908 B2 11/2016 Shore et al.
9,811,976 B2 11/2017 Shore et al.
9,978,218 B2 5/2018 Shore et al.
10,013,853 B2 7/2018 Shore et al.
10,290,185 B2* 5/2019 Koustas .............. G07F 17/3288
10,504,333 B2 12/2019 Shore et al.
10,916,103 B2 2/2021 Shore et al.
11,189,131 B1 11/2021 Weiksner et al.
11,282,343 B2 3/2022 Shore et al.
2001/0051540 A1* 12/2001 Hindman ............... G06Q 50/34 700/91
2002/0023010 A1 2/2002 Rittmaster et al.
2002/0068633 A1 6/2002 Schlaifer
2002/0094869 A1* 7/2002 Harkham ................ G07F 17/32 463/42
2002/0115489 A1 8/2002 Jordan et al.
2002/0153656 A1 10/2002 Maksymac et al.
2002/0157099 A1 10/2002 Schrader et al.
2003/0157976 A1 8/2003 Simon et al.
2004/0034593 A1 2/2004 Toneguzzo et al.
2004/0048656 A1 3/2004 Krynicky
2004/0166942 A1 8/2004 Muir
2004/0235542 A1 11/2004 Stronach
2004/0268130 A1 12/2004 Pretorius
2005/0055316 A1 3/2005 Williams
2005/0202875 A1 9/2005 Murphy et al.
2006/0009281 A1 1/2006 Stronach
2006/0148551 A1 7/2006 Walker et al.
2006/0172803 A1 8/2006 Hardy et al.
2006/0192334 A1 8/2006 Wittwer
2006/0029062 A1 10/2006 Lai et al.
2006/0253330 A1 11/2006 Maggio et al.
2006/0287091 A1 12/2006 Walker et al.
2007/0015573 A1 1/2007 Angell et al.
2007/0060380 A1 3/2007 McMonigle et al.
2007/0071025 A1 3/2007 Bergstrom et al.
2007/0082731 A1* 4/2007 Matsuno ............. G07F 17/3202 463/25
2007/0082740 A1 4/2007 Stearns et al.
2007/0099696 A1* 5/2007 Nguyen ................. G06Q 40/02 463/25
2007/0257101 A1 11/2007 Alderucci et al.
2008/0039192 A1 2/2008 Laut
2008/0070665 A1 3/2008 Gatto et al.
2008/0076572 A1 3/2008 Nguyen et al.
2008/0096645 A1* 4/2008 Frerking ................. G07F 17/32 463/25
2008/0108437 A1 5/2008 Kaarela et al.
2008/0182644 A1 7/2008 Lutnick et al.
2008/0220854 A1 9/2008 Midgley et al.
2008/0234051 A1* 9/2008 McNutt ............... G07F 17/3288 463/25
2008/0261682 A1 10/2008 Phillips
2008/0274815 A1 11/2008 Root
2009/0062017 A1 3/2009 Kelly et al.
2009/0093292 A1 4/2009 Randhawa
2009/0197684 A1 8/2009 Arezina et al.
2009/0209350 A1 8/2009 Kelly et al.
2009/0215527 A1 8/2009 Lipscomb
2009/0260072 A1 10/2009 Rouskov et al.
2009/0270155 A1 10/2009 Glass et al.
2009/0318219 A1 12/2009 Koustas et al.
2009/0325686 A1 12/2009 Davis et al.
2010/0035672 A1 2/2010 Root
2010/0069144 A1* 3/2010 Curtis ..................... G07F 17/32 463/25
2010/0160012 A1 6/2010 Amaitis et al.
2010/0203963 A1* 8/2010 Allen .................. G07F 17/3225 463/30
2010/0268646 A1 10/2010 Erickson
2010/0279776 A1 11/2010 Hall
2011/0003634 A1 1/2011 Manteris
2011/0065494 A1 3/2011 Kennedy et al.
2011/0117981 A1* 5/2011 Baerlocher ......... G07F 17/3267 463/16
2011/0130197 A1* 6/2011 Bytnar ................ G07F 17/3227 463/25
2011/0177862 A1 7/2011 Amaitis et al.
2011/0256925 A1* 10/2011 Schipani ................ G06Q 50/34 463/28
2012/0046094 A1 2/2012 Shore et al.
2012/0046095 A1 2/2012 Shore et al.
2012/0046109 A1 2/2012 Shore et al.
2012/0071223 A1 3/2012 Sharhov
2012/0077594 A1 3/2012 Carter, Sr.
2012/0129585 A1 5/2012 Laycock et al.
2012/0130853 A1 5/2012 Petri et al.
2012/0174145 A1 7/2012 Frazier et al.
2012/0202587 A1* 8/2012 Allen ...................... G07F 17/32 463/25
2012/0214575 A1 8/2012 Amaitis et al.
2012/0270618 A1 10/2012 Abramoff et al.
2013/0053991 A1 2/2013 Ferraro, III et al.
2013/0072280 A1* 3/2013 Yacenda ............. G07F 17/3225 463/17
2013/0090157 A1* 4/2013 Tharp ................. G07F 17/3223 463/25
2013/0172062 A1* 7/2013 Amaitis .............. G07F 17/3237 463/13
2013/0178277 A1 7/2013 Burman et al.
2013/0196753 A1* 8/2013 Miller ................. G07F 17/3288 463/28
2013/0203488 A1 8/2013 Nguyen
2013/0231185 A1* 9/2013 Steil ........................ A63F 13/00 463/35
2013/0267306 A1* 10/2013 Brook ................. G07F 17/3246 463/25
2013/0288764 A1 10/2013 Chun
2013/0310183 A1* 11/2013 Gagner ............... G07F 17/3202 463/43
2014/0121015 A1 5/2014 Massing et al.
2014/0155145 A1* 6/2014 Arezina .............. G07F 17/3218 463/25
2014/0274352 A1 9/2014 Marshall
2014/0342811 A1 11/2014 Shore et al.
2015/0089595 A1 3/2015 Telles
2015/0170467 A1 6/2015 Shore et al.
2015/0262456 A1 9/2015 Shore et al.
2015/0287278 A1 10/2015 Shore
2015/0287285 A1 10/2015 Shore et al.
2016/0300430 A1 10/2016 Ortiz

(56) References Cited

U.S. PATENT DOCUMENTS

| | | | |
|---|---|---|---|
| 2016/0300431 A1 | 10/2016 | Ortiz |
| 2016/0300432 A1 | 10/2016 | Devaraj |
| 2016/0300433 A1 | 10/2016 | Ortiz |
| 2017/0018145 A1 | 1/2017 | Shore et al. |
| 2017/0039811 A1 | 2/2017 | Devaraj |
| 2017/0069173 A1 | 3/2017 | Shore |
| 2017/0182677 A1 | 6/2017 | Shore |
| 2017/0186277 A9 | 6/2017 | Shore et al. |
| 2018/0089955 A1 | 3/2018 | Shore |
| 2019/0347904 A1 | 11/2019 | Shore et al. |
| 2020/0066105 A9 | 2/2020 | Shore et al. |
| 2020/0066107 A1 | 2/2020 | Shore et al. |
| 2021/0217279 A1 | 7/2021 | Shore et al. |
| 2021/0264735 A1 | 8/2021 | Joao |
| 2021/0306135 A1 | 9/2021 | Chu et al. |
| 2021/0374539 A1 | 12/2021 | Katz et al. |
| 2021/0377041 A1 | 12/2021 | Covaci et al. |
| 2021/0383395 A1 | 12/2021 | Galka |
| 2021/0398107 A1 | 12/2021 | Pogorelik et al. |
| 2021/0400025 A1 | 12/2021 | Agarwal et al. |

OTHER PUBLICATIONS

U.S. Appl. No. 12/972,704; Information Disclosure Statement(s) and Notices of References Cited.
U.S. Appl. No. 13/161,187; Information Disclosure Statement(s) and Notices of References Cited.
U.S. Appl. No. 14/205,097; Information Disclosure Statement(s) and Notices of References Cited.
U.S. Appl. No. 14/247,978; Information Disclosure Statement(s) and Notices of References Cited.
U.S. Appl. No. 14/262,175; Information Disclosure Statement(s) and Notices of References Cited.
U.S. Appl. No. 14/262,301; Information Disclosure Statement(s) and Notices of References Cited.
U.S. Appl. No. 14/568,830; Information Disclosure Statement(s) and Notices of References Cited.
U.S. Appl. No. 15/269,307; Information Disclosure Statement(s) and Notices of References Cited.
U.S. Appl. No. 15/218,311; Information Disclosure Statement(s) and Notices of References Cited.
U.S. Appl. No. 15/724,369; Information Disclosure Statement(s) and Notices of References Cited.
U.S. Appl. No. 15/978,577; Information Disclosure Statement(s) and Notices of References Cited.
U.S. Appl. No. 14/247,978; Non-final office action—Jan. 20, 2015.
U.S. Appl. No. 14/247,978; Reply to non-final office action—Apr. 20, 2015.
U.S. Appl. No. 14/247,978; Final office action—Aug. 13, 2015.
U.S. Appl. No. 14/247,978; Reply to final office action—Nov. 12, 2015.
U.S. Appl. No. 14/247,978; Non-final office action—Jan. 14, 2016.
U.S. Appl. No. 14/247,978; Reply to non-final office action—Apr. 11, 2016.
U.S. Appl. No. 14/247,978; Reply to final office action—Jul. 28, 2016.
U.S. Appl. No. 14/247,978; Notice of Abandonment—Feb. 9, 2017.
U.S. Appl. No. 15/978,577; Non-final rejection—May 7, 2019.
U.S. Appl. No. 15/978,577; Reply to office action—Jun. 17, 2019.
U.S. Appl. No. 15/978,577; Final Office Action—Jul. 12, 2019.
U.S. Appl. No. 15/978,577; Notice of Abandonment—Feb. 6, 2020.
U.S. Appl. No. 14/262,175; Non-final office action—Apr. 26, 2016.
U.S. Appl. No. 14/262,175; reply to office action—Jul. 26, 2016.
U.S. Appl. No. 14/262,175; Final office action—Nov. 8, 2016.
U.S. Appl. No. 14/262,175; Reply to final office action—Jan. 9, 2017.
U.S. Appl. No. 14/262,175; Advisory action—Feb. 1, 2017.
U.S. Appl. No. 14/262,175; reply to office action—Mar. 8, 2017.
U.S. Appl. No. 14/262,175; non-final office action—May 22, 2017.
U.S. Appl. No. 14/262,175; reply to non-final office action—Oct. 20, 2017.
U.S. Appl. No. 14/262,175; final office action—Jan. 12, 2018.
U.S. Appl. No. 14/262,175; response final office action—Mar. 13, 2018.
U.S. Appl. No. 14/262,175; Advisory action—Apr. 2, 2018.
U.S. Appl. No. 14/262,175; Notice of appeal filed—Apr. 12, 2018.
U.S. Appl. No. 14/262,175; Amendment/reply filed—Jun. 12, 2018.
U.S. Appl. No. 14/262,175; Non-final office action—Sep. 12, 2018.
U.S. Appl. No. 14/262,175; Amendment/reply filed—Mar. 12, 2019.
U.S. Appl. No. 14/262,175; Final office action—Jun. 21, 2019.
U.S. Appl. No. 14/262,175; Amendment/reply filed—Jul. 2, 2019.
U.S. Appl. No. 14/262,175; Notice of allowance—Jul. 22, 2019.
"Pari-mutuel." Definition of pari-mutuel by the Free Online Dictionary, Thesaurus and Encyclopedia. The American Heritage Dictionary of the English Language, Fourth Edition copyright 2000 by Houghton Mifflin Company. Updated in 2009 Published by Houghton Mifflin Company. http://www.thefreedictionary.com/pari-mutuel, printed Apr. 15, 2012, 3 pages.
"Randomize." Merriam-Webster Online Dictionary. http://www.merriam-webster.com/dictionary/randomize, printed Apr. 18, 2012, 3 pages.
Information disclosure statements and references in U.S. Appl. No. 15/218,311.
Information disclosure statements and references in U.S. Appl. No. 14/262,301.
U.S. Appl. No. 14/205,097, filed Mar. 11, 2014, Shore et al.
U.S. Appl. No. 14/247,978, filed Apr. 8, 2014, Shore et al.
U.S. Appl. No. 14/262,301, filed Apr. 25, 2014, Shore et al.
U.S. Appl. No. 14/568,830, filed Dec. 12, 2014, Shore et al.
U.S. Appl. No. 15/269,307, filed Sep. 19, 2016, Shore et al.
"Pari-mutuel". Definition of pari-mutuel by the Free Online Dictionary, Thesaurus and Encyclopedia. The American Heritage Dictionary of the English Language, Fourth Edition, Copyright 200 by Hougton Mifflin Company. Updated in 2009. Published by Hougton Mifflin Company. http://www.thefreedictionary.com/pari-mutuel, printed Apr. 15, 2012, 3 pages.
"Randomize". Marriam-Webster Online Dictionary. http://www.merriam-webster.com/dictionary/randomize, printed Apr. 18, 2012, 3 pages.
Eade, V. H. et al., Introduction to the Casino Entertainment Industry (1997) Prentice Hall, Upper Saddle River, New Jersey, pp. 131-132.
Kilby, J., Casino Operations Manage (1998) John Wiley & Sons, Inc., New York, p. 297.
Non-Final Rejection, Jul. 25, 2016; U.S. Appl. No. 15/218,311.
Non-Final Rejection, Jan. 4, 2019; U.S. Appl. No. 15/218,311.
Final Rejection, Jun. 5, 2018; U.S. Appl. No. 15/218,311.
Non-Final Rejection, May 7, 2019; U.S. Appl. No. 15/978,588.
Information Disclosure Statement, Nov. 24, 2015; U.S. Appl. No. 14/262,175.
List of References, Nov. 26, 2016; U.S. Appl. No. 14/262,175.
List of References Considered by Examiner Nov. 26, 2016; U.S. Appl. No. 14/262,175.
Information Disclosure Statement, May 17, 2016; U.S. Appl. No. 14/262,175.
Information Disclosure Statement, Aug. 22, 2016; U.S. Appl. No. 14/262,175.
List of References; Nov. 8, 2016; U.S. Appl. No. 14/262,175.
Information Disclosure Statement, Oct. 26, 2017; U.S. Appl. No. 14/262,175.
List of references, Jan. 12, 2018; U.S. Appl. No. 14/262,175.
List of references, Sep. 12, 2018; U.S. Appl. No. 14/262,175.
Information Disclosure Statement, Jul. 2, 2019; U.S. Appl. No. 14/262,175.
Information Disclosure Statement, Jul. 22, 2019; U.S. Appl. No. 14/262,175.
List of references considered by examiner, Sep. 23, 2019; U.S. Appl. No. 14/262,175.
List of references considered by examiner, Oct. 28, 2019; U.S. Appl. No. 14/262,175.
Notice of Allowance, Jul. 22, 2019; U.S. Appl. No. 14/262,175.
U.S. Appl. No. 17/562,828, Notice of Allowance dated Jun. 12, 2023.

(56) References Cited

OTHER PUBLICATIONS

U.S. Appl. No. 17/562,828, Information Disclosure Statement, May 16, 2023.
U.S. Appl. No. 17/562,828.

* cited by examiner

LOCATION-BASED WAGERING VIA REMOTE DEVICES

CROSS-REFERENCE AND PRIORITY TO PATENT APPLICATIONS

This patent application is a continuation of U.S. patent application Ser. No. 15/218,311, entitled "Location-Based Wagering Via Remote Devices," which was filed on Jul. 25, 2016, and is incorporated herein by reference in its entirety U.S. patent application Ser. No. 15/218,311 in turn is a continuation of U.S. patent application Ser. No. 14/262,301 entitled "Location-Based Wager Via Remote Devices," which was filed on Apr. 25, 2014, which is incorporated herein by reference in its entirety. U.S. patent application Ser. No. 14/262,301 issued as U.S. Pat. No. 9,430,909 on Aug. 30, 2016.

U.S. patent application Ser. No. 14/262,301 claims the benefit under 35 U.S.C. § 119 (e) of U.S. Provisional Application Ser. No. 61/976,554 entitled, "Location-Based Wagering Via Remote Devices," which was filed on Apr. 8, 2014 and is incorporated herein by reference in its entirety. This patent application therefore claims priority to and the benefit of U.S. Provisional Application Ser. No. 61/976,554 filed on Apr. 8, 2014.

TECHNICAL FIELD

Embodiments are generally related to sports and event betting. Embodiments are also related to online gaming and wagering. Embodiments are additionally related to systems and methods that allow users utilizing remote devices to wager on events of any type in a data network accessible gaming environment facilitated by one or more network servers and based on particular parameters such as, for example, the location of the user and/or other data.

BACKGROUND

Betting on sports and other events is a multi-billion dollar business. Casinos, for example, have large sports and event betting parlors for attracting bettors. These parlors display the bets that a person may make on various sporting or types of events. Bets are placed on most major sports including professional and college football, soccer, baseball, basketball, auto racing, and ice hockey, as well as cricket and rugby. Further, bets are placed on various sports tournaments, including the NCAA Men's and Women's Basketball Championships and World Cup Soccer. Also, bets may be placed on other types of events including a selection of the winner of a reality television show (e.g., the Survivor reality show), election results, weather events, when the first person lands on Mars, the winner of the next United States Presidential election, or any other type of event.

In general, gambling is the wagering, or betting, of money or something of material value (referred to as "the stakes") on an event with an uncertain outcome with the primary intent of winning additional money and/or material goods. Typically, the outcome of the wager, or bet, is evident within a short period. The term "gaming" in this context typically refers to instances in which the activity has been specifically permitted by law. The two words are not mutually exclusive; i.e., a "gaming" company offers (legal) "gambling" activities to the public. This distinction is not universally observed in the English-speaking world, however. For instance, in the UK, the regulator of gambling activities is called the Gambling Commission (not the Gaming Commission). Also, the word gaming is frequently used to describe activities that do not involve wagering, especially online. While almost any game can be played for money, and any game typically played for money can also be played just for fun, some games are generally offered in a casino setting. Gaming can also be accomplished for non-monetary prizes, such as coupons, "points" that can be redeemed for merchandise or discounts and other promotional or recreational purposes.

Fixed odds betting and parimutuel betting frequently occur at many types of sporting events, and political elections. In addition, many bookmakers offer fixed odds on a number of non-sports related outcomes; for example, the direction and extent of movement of various financial indices, the winner of television competitions such as Big Brother, and election results. Interactive prediction markets also offer trading on these outcomes; with "shares" of results trading on an open market. One of the most widespread forms of gambling involves betting on horse or greyhound racing. Wagering may take place through parimutuel pools, non-parimutuel betting arrangements, or bookmakers may take bets personally. Parimutuel wagers, for example, pay off at prices determined by support in the wagering pools, while bookmakers pay off either at the odds offered at the time of accepting the bet; or at the median odds offered by track bookmakers at the time the race started. Parimutuel betting (from the French language, Pari Mutuel or mutual betting) is a betting system in which all bets of a particular type are placed together in a pool, taxes and a house "take" or "vig" are removed by the gaming sponsor or organizer, and payoff odds are calculated by sharing the pool among all winning bets. In some countries, it is known as the Tote after the totalisator, which calculates and displays bets already made.

Parimutuel and/or non-parimutuel betting systems are utilized in gambling events, such as horse racing, greyhound racing, jai alai, etc., and most sporting events of relatively short duration in which participants finish in a ranked order. A modified parimutuel system has also been adapted for use in some lottery games. Betting on team sports has become an important service industry in many countries. For example, millions of Britons play the football pools every week. In addition to organized sports betting, both legal and illegal, there are many side-betting games played by casual groups of spectators, such as NCAA Basketball Tournament Bracket Pools, Super Bowl Squares, Fantasy Sports Leagues with monetary entry fees and winnings, and in-person spectator games like Moundball.

Arbitrage betting is a theoretically risk-free betting system in which every outcome of an event is bet upon so that a known profit will be made by the bettor upon completion of the event, regardless of the outcome. Arbitrage betting is a combination of the ancient art of arbitrage trading and gambling, which has been made possible by the large numbers of bookmakers in the marketplace, creating occasional opportunities for arbitrage.

One can also bet with another person that a statement is true or false, or that a specified event will happen (a "back bet") or will not happen (a "lay bet") within a specified time. This occurs in particular when two people have opposing but strongly held views on truth or events. Not only do the parties hope to gain from the bet, they place the bet also to demonstrate their certainty about the issue. Some means of determining the issue at stake must exist. Sometimes the amount bet remains nominal, demonstrating the outcome as one of principle rather than of financial importance.

A multiplayer video game is one within which more than one person can play in the same game environment at the same time. Unlike most other games, computer and video games are often single-player activities that pit the player against preprogrammed challenges and/or AI (artificial intelligence)-controlled opponents, which often lack the flexibility and ingenuity of regular human thinking. Multiplayer components allow players to enjoy interaction with other individuals, be it in the form of partnership, competition or rivalry, and provide them with a form of social communication that is almost always missing in single-player oriented games. In a variety of different multiplayer game types, players may individually compete against two or more human contestants, work cooperatively with a human partner(s) in order to achieve a common goal, supervise activities of other players, or engage in a game type that incorporates any possible combination of the above. Multiplayer games typically require the players to share resources of a single game system or use networking technologies that allow players to play together over greater distances.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide methods and systems that allow users of remote communication and display devices (e.g., smartphones, tablet computing devices, laptop computers, home computers, servers, etc.) to view gaming event information, including any of video, statistics and online betting options, and also enable betting based on the location of the user and other parameters.

In one embodiment, a GPS-based or other location detection based method and system can be implemented, wherein when a user logs onto the system from a location using a mobile device (e.g., tablet, laptop, smart phone, Wi-Fi enabled computer, etc.), the location of the user is determined and sent to the system so that the system is aware of where the user is located. Based on that location, the system knows (1) whether use of the system is legal/allowed in that jurisdiction; (2) if legal/allowed, what limits exist in that location on the types/amounts of bets as prescribed by laws and regulations; and (3) based on those prescribed limits, the options presented to the user are conformed to the laws and regulations that apply.

In another embodiment, a GPS-based or other location detection based method and system can be implemented wherein when a user logs onto the system from a location using a mobile device (e.g., tablet, laptop, smart phone, Wi-Fi enabled computer, etc.), the location of the user is sent to the system so that the system knows where the user is located. Based on that location, the system will know (1) what the requirements are for a user to participate in that jurisdiction (e.g., age, disclosures/disclaimers that must be presented, notices that must be provided and verified etc.); (2) utilize methods to verify that the user is qualified (e.g., age verification) and; (3) making any necessary reports or disclosures that the proper notices were provided and verified to have been read, understood and agreed upon by the user to ensure a user is qualified to participate.

In yet another embodiment, a GPS-based or other location detection based method and system ca be implemented wherein when a user logs onto the system from a location using a mobile device (e.g., tablet, laptop, smart phone, Wi-Fi enabled computer, etc.), the location of the user is sent to the system so it knows where the user is located. Based on that location, the system will know (1) whether use of the system is taxed in that jurisdiction; (2) if taxed, the system will calculate the user's taxes or the system owner's taxes and ensure that the taxes are properly accounted for any paid, either by deducting the taxes from the user's account or ensuring that the system operator's taxes are reported In another embodiment, at certain random or pre-determined intervals, the user may be required to verify that it (the user) is a person using the system and not a machine.

In yet another embodiment, the GPS based or other location based system can be used to identifying other users who are located in a location that permits gaming with the first user. For example, if the first user initiates a parimutuel betting game within a venue, but gaming is only permitted inside the venue, the GPS-based or other location detection-based system can identify other users located within the venue who can participate in that game.

It should be appreciated that the disclosed embodiments can apply to any form of online gaming using mobile devices and not just micro-betting. "Micro-betting" as discussed herein is for exemplary or illustrative purposes only and is not considered a limiting feature of the disclosed embodiments.

In general, the GPS or other location-based method and system can be e used to choose the correct method to, for example, calculate taxes owed in jurisdictions where gambling is legal and to report/pay those taxes. Such a GPS or other location-based method system can be used to choose from various authorization forms to ensure only persons legally authorized to gamble in a location are allowed access to the site. In addition, such a GPS or other location-based method/system can be used to choose from various available forms of gambling that are legal in the jurisdictions. The disclosed GPS or other location based method/system or service can be employed to authorize particular gambling types (e.g., blackjack, poker, horse racing, sports betting, etc.) that are legal in the jurisdiction. In addition, operations can be implement to impose on the gambling, limits prescribed in the jurisdiction (e.g., amount of bets, amount of losses, number of bets, etc.).

It is another aspect of the disclosed embodiments to provide for systems and methods that allow users of remote devices to wager on events of a competitive entertainment event occurring in a gaming environment via access to a network server over a data network.

It is another aspect of the disclosed embodiments to provide for systems and methods that allow users of portable device to securely wager on events of a competitive entertainment event occurring in a gaming environment, such as a casino or sports venue, via access through transponders deployed throughout the venue to a network server managing secure wagering.

It is another aspect of the disclosed embodiments to provide for systems and methods that allow users of portable device to securely wager on events of a competitive entertainment event occurring in a gaming environment, such as a casino or sports venue, via access to a network server managing secure wagering where images of data are displayed on a wearable device such as data-enabled eyeglasses or eyewear (e.g., GoogleGlass, etc.) or a head mounted display.

It is another aspect of the disclosed embodiments to provide for systems and methods that allow users of portable device to securely wager on events of a competitive entertainment event occurring in a gaming environment, such as a casino or sports venue, via, for example, access through secure transponders deployed throughout a venue to a network server managing secure wagering wherein images of data are displayed on data-enabled glasses (e.g., Google-Glass, etc.) with data from at least one of a portable electronic device (e.g., smartphone or tablet computer) carried by a user or directly from secure transponders.

It is still a further aspect of the disclosed embodiments to provide methods and systems including the use of Google glasses that can be used to view data (bets, scores, status, video) while watching the live venue or while the event is playing on a big screen. The user will still place bets on a tablet or smartphone, that is also in data communication with the Google glasses. Google glasses are going to be hot wearable technology in the near future and will most certainly be used for everything including gaming applications and within venues such as sports stadiums, casinos, concert halls, and so forth.

It is yet another aspect of the disclose embodiments to provide systems and methods wagering in association with computer games (e.g., like Madden NFL, FIFA Soccer/Football, and even Call of Duty). In such a scenario, the venue would be virtual but the play would be just as real. Since many gamers play interactively over a network, they can place bets and microbets with each other during the game to enhance play. And the game can accompany or a real game, thereby permitting gamers to expand upon reality (e.g., simulate outcomes if different plays were run). Also, the computer game can be used as a platform for receiving other betting opportunities (from other real ongoing games, from other ongoing video games, etc.) during play. Another feature would be to add fantasy platforms, such as Yahoo! Fantasy Baseball.

It is also an aspect of the disclosed embodiments to provide a system for betting on outcomes occurring during an event via computing devices such as smartphones, tablets, laptop computers, personal computers, and so on. Such a system can include a server for brokering wagers occurring during events and at least one remote device in communication with the server requesting placement of wagers occurring during the event.

It is another aspect of the disclosed embodiments that remote devices include desktop computers, laptop computers, set-top boxes, gaming consoles, Internet-enabled High Definition Televisions Sets (HDTVs) and portable wireless handheld devices such as Smartphones, PDAs (Personal Digital Assistants) and proprietary portable devices rented to users at a venue.

It is still another aspect of the disclosed embodiments that wagering includes the commitment or exchange of credits, coupons or electronic cash for a microbet.

It is a further aspect of the disclosed embodiments that communications between remote devices and servers brokering wagers be secured.

It is another aspect of the disclosed embodiments is to authenticate users of portable devices including requiring user entry of any combination of user name, user information, user age, passwords, biometrics, security codes to enable registration and secure access to gaming services provided by servers brokering wagers. Authentication can include in some instances determination of the user's location based on the device's GPS location or its communication of a with a network to assure that the user is allowed to engage in gaming from the determined location.

It is another aspect of the disclosed embodiments is to determine to location of a user based on the location of a portable electronic device (e.g., smartphone or tablet) to determine if user is allowed to engage in microgaming. Location can be determined by GPS or utilizing network access information, such as IP addresses, or triangulation based on device communication with cellular antennae's. A user's age call also be determined and then the user authenticated during subsequent sessions. Authentication of age can be based on biometrics read from a user, where biometrics can be obtained during initial set up when user age can be confirmed in person or remotely by gaming authorities or other controlling parties. Authorization of user to engage in microgaming can be determined based on age, location, applicable law for a given location, betting limits, and other established gaming rules.

In another embodiment, user name and passwords can be utilized to enable registration and secure access to personal accounts and account credit balances stored on servers providing gaming services to remote devices.

In another embodiment, one or more services can be implemented, which include a wagering module for brokering wagers transmit confirmation data via the data network to the remote device (or devices) that a particular bet or wager has been placed.

In still another embodiment, a video display of the remote device can display video from a sports venue, along with player/team information and statistics, and wagering data and input fields accessible by the remote device user.

In another embodiment, a video display on or associated with the remote device can provide wagering data and input fields accessible by a remote device user and a user interface on the remote device enable user interaction with wagering input fields by a remote device user.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
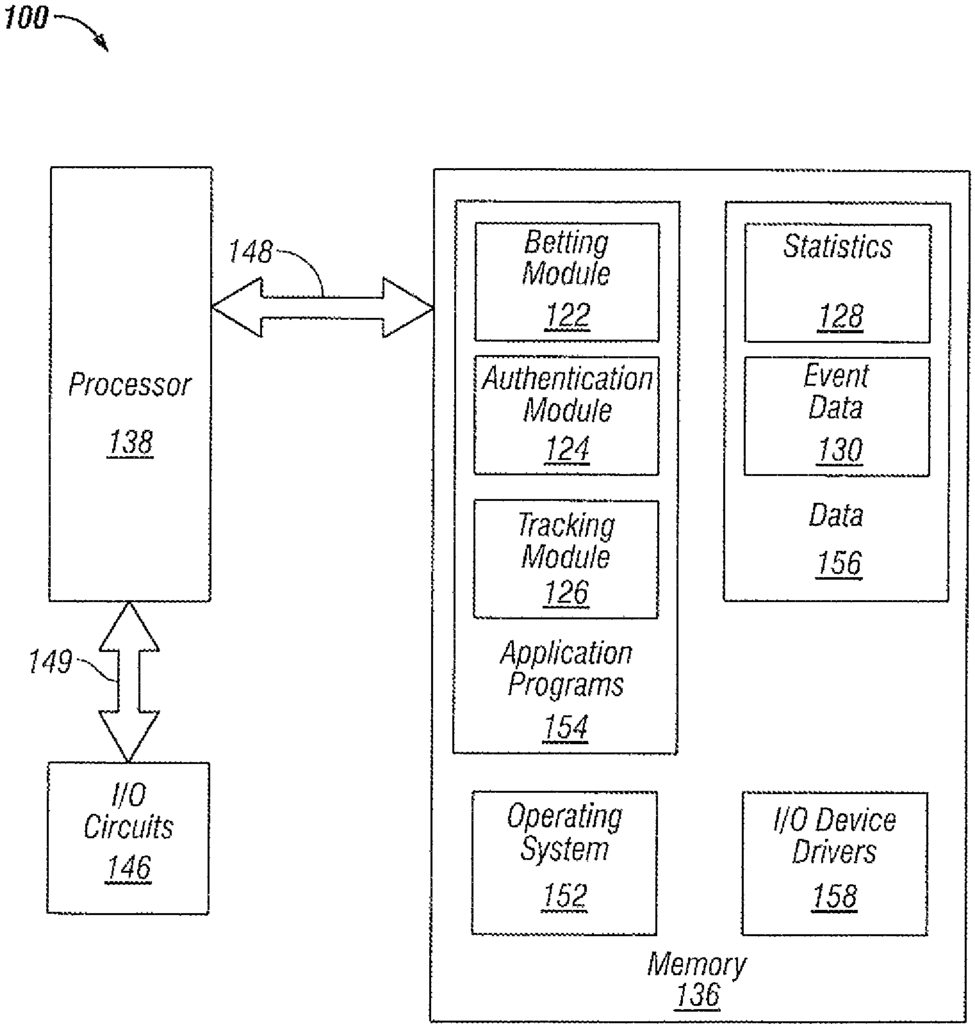
FIG. 1 illustrates a high-level block diagram of an exemplary data processing system or wagering module/database environment that may be included in devices operating in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art following the disclosure provided herein, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized, including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic. The program code may execute entirely on the user's computer, partly on the user's computer, as a stand-alone software package, partly on the user's computer and partly on a remote computer or entirely on the remote computer.

A remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider). A user's computer can include a portable electronic device, such as a smartphone or tablet computer, that can communicate wirelessly over data communications networks.

Authentication can include the use of user names, passcodes, biometrics, device identification. Portable electronic device location can also be determined based on GPS or via network communication. Authentication can also include the determination of a user's location based on the location of the user's portable electronic device.

Beacons or transponders and referred to herein can include use of an electronic device that can facilitate bi-directional communications with portable devices (e.g., smartphones) carried by users within a venue. Beacons can include wireless data communications hardware and software to facilities location-based services and user location determination within a venue.

"Glass" as referred to herein can refer to portable data-enabled glasses, such as "Google Glasses" that communicate with networks or portable computers to facilitates the dissemination of information to users and enables users to control or manipulate data with a user-interface that can be incorporated into the Glass. Glass can include wireless communications, user interfaces and at least one digital camera.

Embodiments are described at least in part herein with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Referring now to FIG. 1, an exemplary data processing system 100 or wagering module/database environment that may be included in devices operating in accordance with some embodiments of the present invention will be discussed. As illustrated, the data processing system 100 includes a processor 138, a memory 136 and input/output circuits 146. The data processing system 100 may be incorporated in, for example, a personal computer, a portable wireless hand held device (e.g., Smartphone, etc.), set top box, smart tv, gaming counsel, server, router or the like. The processor 138 communicates with the memory 136 via an address/data bus 148 and communicates with the input/output circuits 146 via an address/data bus 149. The input/output circuits 146 can be used to transfer information between the memory 136 and another computer system or a network using, for example, an Internet Protocol (IP) connection and/or wireless or wired communications. These components may be conventional components such as those used in many conventional data processing systems, which may be configured to operate as described herein.

In particular, the processor 138 can be any commercially available or custom microprocessor, microcontroller, digital signal processor or the like. The memory 136 may include any memory devices containing the software and data used to implement the functionality circuits or modules used in accordance with embodiments of the present invention. The memory 136 can include, but is not limited to, the following types of devices: cache, ROM, PROM, EPROM, EEPROM, flash memory, SRAM, DRAM and magnetic disk. In some embodiments of the present invention, the memory 136 may be, for example, a content addressable memory (CAM).

As further illustrated in FIG. 1, the memory 136 may include several categories of software and data used in the data processing system 100: an operating system 152; application programs 154; input/output device drivers 158; and data 156. As will be appreciated by those of skill in the art, the operating system 152 may be any operating system suitable for use with a data processing system, such as, for example, Linux, Windows XP, Mac OS, Unix, etc. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data 156 represents static and dynamic data that can be used by the application programs 154, the operating system 152, the input/output device drivers 158, and other software programs that may reside in the memory 136. As illustrated in FIG. 1, the data 156 may include, for example, statistics 128 and event information 130 for use by the circuits and modules of the application programs 154 according to some embodiments of the present invention as discussed further herein. The event information, for example, may include data associated with a particular event. Statistics 128 may include, for example, not only statistical information related to a particular event, but also broader statistics, such as, for example, team history and sports scores.

In the embodiment shown in FIG. 1, application programs 154 can include, for example, a wagering or betting module 122, a security or authentication module 124, a tracking module 126, and so forth. While the present invention is illustrated with reference to the betting module 122, the authentication module 124, and the tracking module 126 being application programs in FIG. 1, as will be appreciated by those of skill in the art, other configurations fall within the scope of the present invention. For example, rather than being application programs 154, these modules may also be incorporated into the operating system 152 or other such logical division of the data processing system 100.

Furthermore, while betting module 122, the authentication module 124, and the tracking module 126 are illustrated in a single data processing system, as will be appreciated by those of skill in the art, such functionality may be distributed across one or more data processing systems. Thus, the present invention should not be construed as limited to the configuration illustrated in FIG. 1, but may be provided by other arrangements and/or divisions of functions between data processing systems. For example, although FIG. 1 is illustrated as having various circuits/modules, one or more of these circuits may be combined without departing from the scope of the present invention.

Note that as utilized herein the term "module" generally refers to a collection or routines (and/or subroutines) and/or data structures that performs a particular task or implements a particular abstract data type. Modules usually include two parts: an interface, which lists the constants, data types, variables, and routines that can be accessed by other modules or routines, and an implementation, which is typically, but not always, private (accessible only to the module) and which contains the source code that actually implements the routines in the module. The term "module" may also refer to a self-contained component that can provide a complete function to a system and can be interchanged with other modules that perform similar functions.

In addition, the modules 122, 124, 126 of application programs 154 shown in FIG. 1, other modules may be included such as, for example, a location-based module 155, which may be GPS-based or based on other types of location-based data and systems/devices (e.g., transponders such as the Apple "iBeacon," triangularization techniques, cellular phone locating, IP address, etc.). The location-based module 155 can thus be employed to determine the location of the remote device (e.g., smartphone, tablet computing device, laptop computer) or system 100. It can be appreciated that modules such as modules 122, 124, 126, 155, etc., can communicate with one another or work together to perform particular instructions and may be instituted as separate application programs (e.g., a mobile "app") or as a single "app" or program depending upon design considerations. Thus, for example, module 155 can provide locating operations (e.g., locate the device or system 100) or may do so in combination with other modules, such as authentication module 124, tracking module, betting module 122, etc. Location-based services and operations are described in greater detail below.

Figure 2:
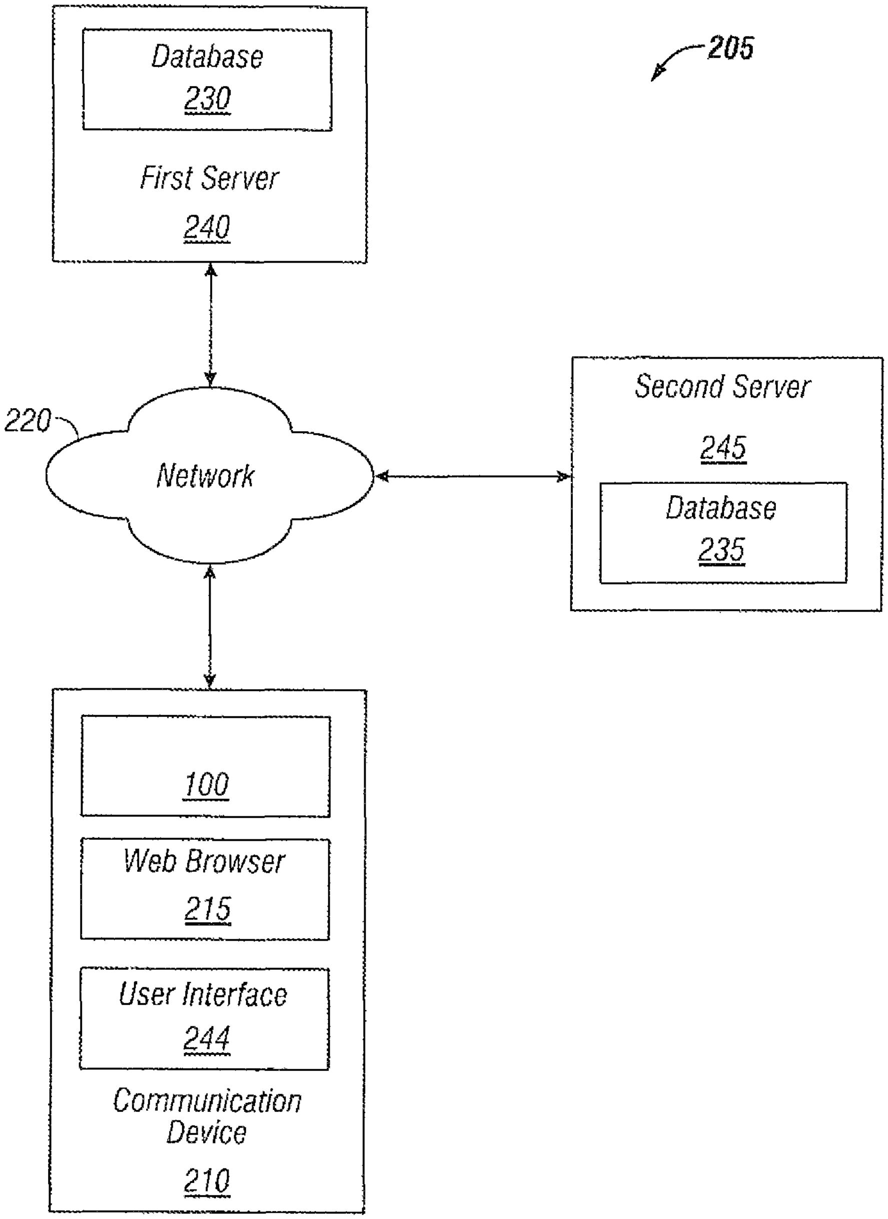
FIG. 2 illustrates an exemplary environment for operations and devices in accordance with the disclosed embodiments.

Referring now to FIG. 2, an exemplary environment 205 for operations and devices according to some embodiments of the present invention will be discussed. As illustrated in FIG. 2, the environment 205 may include a communications/computing device 210, a data communications network 220, a first server 240 and a second server 245. It can be appreciated that additional servers may be utilized with respect to network 220. It can also be appreciated that in some embodiments, only a single server, such as server 240 may be required. In general, the communications device 210 allows a user of the communications device 210 to view a macro-event and also bet on the micro-outcomes of various events (both discreet and cumulative) occurring during and within the macro-event utilizing bi-directional communications of the remote device 210 with one or more servers 240, 245, etc., over the data communications network 220. Communications device 210 can be, for example, a portable mobile device, such as, for example, a PDA (Personal Digital Assistant), Smartphone, tablet computing device, a laptop computer or a wearable device such as, for example, data-enabled eyewear or eyeglasses (e.g., GoogleGlass, etc.).

As illustrated, the communications device 210 illustrated in FIG. 2 may include the wagering module or system 100 according to some embodiments of the present invention discussed above with respect to FIG. 1. For example, the application programs 154 discussed with respect to FIG. 1 could be included as part of the wagering system module 100 of the communications device 210. The communications device 210 may be, for example, a laptop computer, a desktop computer, a personal data assistant (PDA), Smartphone, a web capable mobile terminal or any device capable of communicating with the network 220.

The communications device 210 may include, for example, a user interface 244, which may be used to enter wagers according to some embodiments of the present invention, and a web browser 215 that may be accessed through the user interface 244, according to some embodiments of the present invention. As discussed above, the wagering system module 100 may be configured to permit a user to place bets via the communications device 210. The first server 240 may include a database 230 and the second server 245 may include a database 235. The communications device 210 may communicate over the network 220, for example, the Internet, through a wireless communications link, an Ethernet connection, a telephone line, a digital subscriber link (DSL), a broadband cable link, other wireless links, etc. The first and second servers 240 and 245 may also communicate over the network 220. Thus, the network 220 may convey data between the communications device 210 and the first and second servers 240 and 245. The network 220 can be, for example, a wireless communications network, such as, for example, a cellular communications network or 802.11/WiFi network. The network 220 can also be a client-server network.

The remote computing device 210 can be for example, a desktop computer, a laptop computer, a set-top box, or portable wireless handheld devices such as a Smartphone, tablet computer, laptop and/or PDA. The remote computing device 210 can also be, for example, a device such as an Apple iPhone, iPad type computing device.

The location based module 155 shown in FIG. 1 can be a GPS-based or other location based device that allows a user to log onto, for example, the network 220 or system 205 from a location using the mobile device or system 100 (e.g., tablet, laptop, smart phone, Wi-Fi enabled computer, etc.). The location of the user is determined and sent to the system 205 so that the system 205 is aware of where the user is located. Based on that location, the system 205 knows (1) whether use of the system is legal/allowed in that jurisdiction; (2) if legal/allowed, what limits exist in that location on the types/amounts of bets as prescribed by laws and regulations; and (3) based on those prescribed limits, the options presented to the user are conformed to the laws and regulations that apply.

In another embodiment, the GPS-based or other location detection based method and system can be implemented with module 155 wherein when a user logs onto the system 205 or network 220 from a location using the mobile device 100 (e.g., tablet, laptop, smart phone, Wi-Fi enabled computer, etc.). The location of the user is sent to the system 205 or network 220 so that the system/network "knows" where the user is located. Based on that location, the system will know (1) what the requirements are for a user to participate in that jurisdiction (age, disclosures/disclaimers that must be presented, notices that must be provided and verified etc.); (2) utilize methods to verify that the user is qualified (e.g., age verification) and; (3) making any necessary reports or disclosures that the proper notices were provided and verified to have been read, understood and agreed upon by the user to ensure a user is qualified to participate.

In yet another embodiment, a GPS-based or other location detection based method and system can be implemented with module 155 wherein when a user logs onto the system from a location using a mobile device (e.g., tablet, laptop, smart phone, Wi-Fi enabled computer, etc.), the location of the user is sent to the system so it knows where the user is located. Based on that location, the system 205 or network 220 can know (1) whether use of the system is taxed in that jurisdiction; (2) if taxed, the system will calculate the user's taxes or the system owner's taxes and ensure that the taxes are properly accounted for any paid, either by deducting the taxes from the user's account or ensuring that the system operator's taxes are reported In another embodiment, at certain random or pre-determined intervals, the user may be required to verify that it (the user) is a person using the system 205 and/or network 220 and not a machine.

In yet another embodiment, the GPS based or other location based system (e.g., via module 155) can be used to identifying other users who are located in a location that permits gaming with the first user. For example, if the first user initiates a parimutuel betting game within a venue, but gaming is only permitted inside the venue, the GPS-based or other location detection-based system can identify other users located within the venue who can participate in that game.

It should be appreciated that the disclosed embodiments can apply to any form of online gaming using mobile devices and not just micro-betting. "Micro-betting" as discussed herein is for exemplary or illustrative purposes only and is not considered a limiting feature of the disclosed embodiments.

In general, the GPS or other location-based method and system can be e used to choose the correct method to, for example, calculate taxes owed in jurisdictions where gambling is legal and to report/pay those taxes. Such a GPS or other location-based method system can be used to choose from various authorization forms to ensure only persons legally authorized to gamble in a location are allowed access to the site. In addition, such a GPS or other location-based method/system can be used to choose from various available forms of gambling that are legal in the jurisdictions. The disclosed GPS or other location based method/system or service can be employed to authorize particular gambling types (e.g., blackjack, poker, horse racing, sports betting, etc.) that are legal in the jurisdiction. In addition, operations can be implemented to impose on the gambling, limits prescribed in the jurisdiction (e.g., amount of bets, amount of losses, number of bets, etc.).

Figure 3:
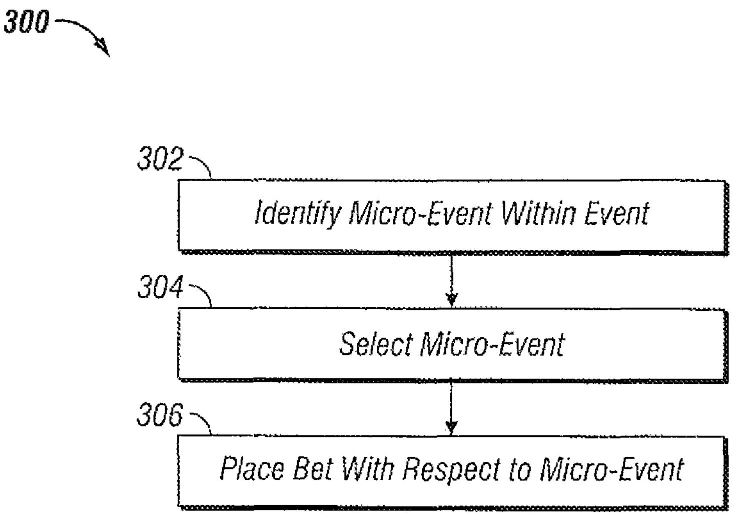
FIG. 3 illustrates a high-level flow chart of operations depicting logical operational steps of a method for enabling one or more remote device users to wager on games in a data network access to a gaming environment, in accordance with the disclosed embodiments.

FIG. 3 illustrates a high-level flow chart of operations depicting logical operational steps of a method 300 for enabling one or more remote device users to wager on games in a data network access to a gaming environment, in accordance with the disclosed embodiments. Note that FIG. 3 discusses micro-events and micro-betting but it can be appreciated that the disclosed embodiments can be implemented in the context of general betting and wagering not just micro-betting.

As indicated at block 302, an operation can be implemented to identify a micro-event with an event utilizing a remote computing device, such as, for example, the remote computing/communications device 210 depicted in FIG. 2. Once the micro-event has been identified, then the micro-event (e.g., a player swinging a bat in the context of a particular inning of a baseball game) can be selected utilizing such a remote computing device, as described at block 306. Thereafter, as illustrated at block 306, a micro-bet (i.e., a wager, bet, etc.) can be placed with respect to the micro event through a network, such as network 220, utilizing the remote computing device 210. Data indicative of the micro-bet is transmitted from the remote computing device 210 for placement of the micro-bet via one or more servers (e.g., server 240, 245, etc.) in communication with the network 220.

In general, the method 300 depicted in FIG. 3 allows a user of the remote computing device 210 to wager on one or more micro-outcomes (discreet and cumulative) that result from the conduct of a macro-event via access to network servers 240 and/or 245, etc., over the data network 220.

Figure 4:
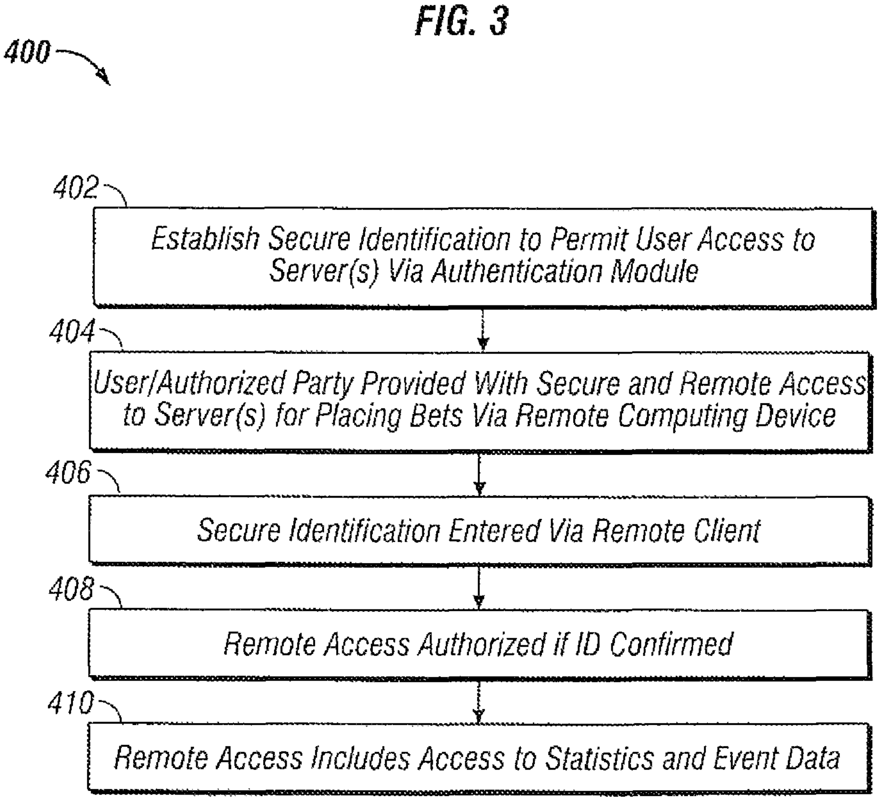
FIG. 4 illustrates a high-level flow chart of operations depicting a method for authentication of a user of a remote computing device, in accordance with the disclosed embodiments.

FIG. 4 illustrates a high-level flow chart of operations depicting a method 400 for authentication of a user of a remote computing device, in accordance with the disclosed embodiments. As illustrated at block 402, a secure identification can be established to permit a user of the remote computing device 210 access to one or more of the servers 240, 245, etc., through the network 220 via the authentication module 124. Authentication can include requesting user identification information (e.g., user ID, Password, age), biometrics, and a determination of location from GPS or network connections. Either authentication of user identity alone, or identity together with location information may be necessary to authorize gaming given legal limitations or other location-based restrictions that might apply to a user's location based on the actual physical location of the device being used. Next, as depicted at block 404, the user/authorized party is provided with secure and remote access to one or more of the servers 240, 245, etc., for placing bets via the remote computing device 210. The user of the remote computing device 210 can then actually enter his or her secure identification via the remote computing device 210 as described at block 406. Remote access can then be granted to the user if his or her identification information is confirmed as depicted at block 408. Remote access can to one or more of the servers 240, 245, etc., via the network 220 includes, for example, access to statistics and event data, as indicated at block 410. Such information can be utilized by the user in consideration for placing his or her micro-bet with respect to a micro-event via the remote computing device 210.

Note that although bets/wagers can be placed by remote device users on the outcome of a macro-event any time before or during, but before the conclusion of, a macro-event, the user(s) are not able to bet on micro-events outcomes or cumulative micro-outcomes occurring during and within the macro-event. The disclosed embodiments thus provide systems and methods for enabling of micro-betting. Micro-events with micro-outcomes can occur several or more times, for example, during an overall sporting macro-event, or game or be calculated at the conclusion of segments of the macro event (e.g., quarters, halves, etc.) or the entire macro event. For example, each swing of a baseball bat by a baseball player in a professional baseball game is a micro-event that can itself be a part of, or contribute to, a micro-outcome. The micro-outcome in such a case is the result of the pitch or the overall at bat. A wager can be whether the pitch is a strike, a ball or a walk. This might be the smallest possible micro-outcome at that moment in the macro-event.

Another type of micro-outcome that is larger than the outcome of a single pitch within the macro-event baseball game would be whether the player currently at bat, for example, walks, strikes out, is hit by a pitch, flies out, grounds out, hits a single, double, triple, home run or inside the park home run, reaches on a fielder's choice, or reaches on an error. A micro-outcome bet could even be placed that not only will the batter ground out, but that he will ground out to a particular fielder. Utilizing the approach described herein, micro-bets in baseball can be placed, for example, on cumulative micro-events such as how many errors a team will commit in a game, how many hits the team will have, how many pitchers they will use, etc. The only limitation would be that the micro-bet would have to be verifiable by reference to the macro-event's official statistics so that the dispute of a micro-outcome would have a neutral reference point.

In an election macro-event, for example, the micro-outcomes eligible for micro-bets might be on the winner in an individual precinct, state or other counted and reported area, the margin of victory, etc. Odds can be assigned to each of these potential outcomes either on a parimutuel or some other basis such as historical averages. Bets placed on a micro-event can be against the house, or can be against other players participating in a social microgaming environment hosted by a server. The following non-limiting scenarios provide examples of micro-events. A number of scenarios are possible, and any macro-event or series of events with official statistics tracking micro-outcomes within the macro-event are eligible for this system of gaming.

In one scenario, for example, Person X watches a football game in real time utilizing a remote computing device 210, and places a bet that the quarterback on football Team A will throw (micro-outcome) on the next play. The odds are given on the display based on pari-mutuel calculations based upon the micro-betting positions of other similarly situated users. The displayed odds are 3/2. Person X bets $1 and the quarterback does not attempt a pass. Person X's account is debited $1, and the balance in his account remains available to place another micro-bet on any micro-event, or micro-outcome that may follow. Person X then places a micro-bet that on the next play Team A will suffer an interception. Because of the micro-betting positions of other users, the odds of this outcome are displayed as 150/1. These actions continue throughout the game until the end of the macro-event (game) or Person X's account is empty of available betting funds. Micro-betting allows Person X to take positions counter to prior bets (betting a quarterback will throw 2 touchdown passes in one cumulative micro-bet and in another micro-betting he throws none), bet repeatedly on discreet micro-events' outcomes within the game and continuously "play" the macro-event with the participants through micro-betting both in real time or on micro-outcomes tracked by official statistics (e.g., how many catches a receiver will have in a game, how many penalties a team will suffer, how many rushing yards a back will gain, etc.). This level of participation means the player does not have to wait for long periods to track his/her progress in the event.

In another scenario, for example, Person Y places a bet utilizing remote computing device 210 on a particular player during a baseball game. For example, Person Y places a bet that a batter from Team A hits a home run during the game, a cumulative micro-bet. However, Person Y notices that the batter from Team B is playing well. Person Y is allowed to also place a bet on a batter from Team B since it has become obvious that during the game that particular batter is playing well and may score a home run. As long as the game is continuing and the odds are being updated, the micro-bets remain available. Another bet during a baseball game would be if Person Y places a bet on how many runs will be scored before each particular inning, or even in each inning. During the game Person Y is able to place multiple bets that do not rely on the overall score of the game but components of the game such as a player's performance (e.g., hits, runs, RBI, errors, etc.).

In yet another scenario, for example, during a basketball game Person X places a bet via the remote computing device 210 on the amount of points a particular player will score, a cumulative micro-bet. As the game progresses Person X can place bets on other players. In addition to a player's performance, Person X can place a bet on the score of the game or developments in the game in general (whether a couch will receive a technical foul).

In still another scenario, for example, during a game of golf, Person Y places a bet on Golfer A who is predicted to win the tournament. However, on the very first hole Golfer A hits a triple bogey, as a result, Person Y decides to place a micro-bet that Golfer A will hit a shot out of bounds or that Golfer A will miss a 5' putt.

Throughout the particular game in which bets are being placed, micro-betting via the remote computing device 210 allows the gambler to feel as if they're "in the game" and even after losing early bets can win their money back by placing different subsequent bets.

Figure 5:
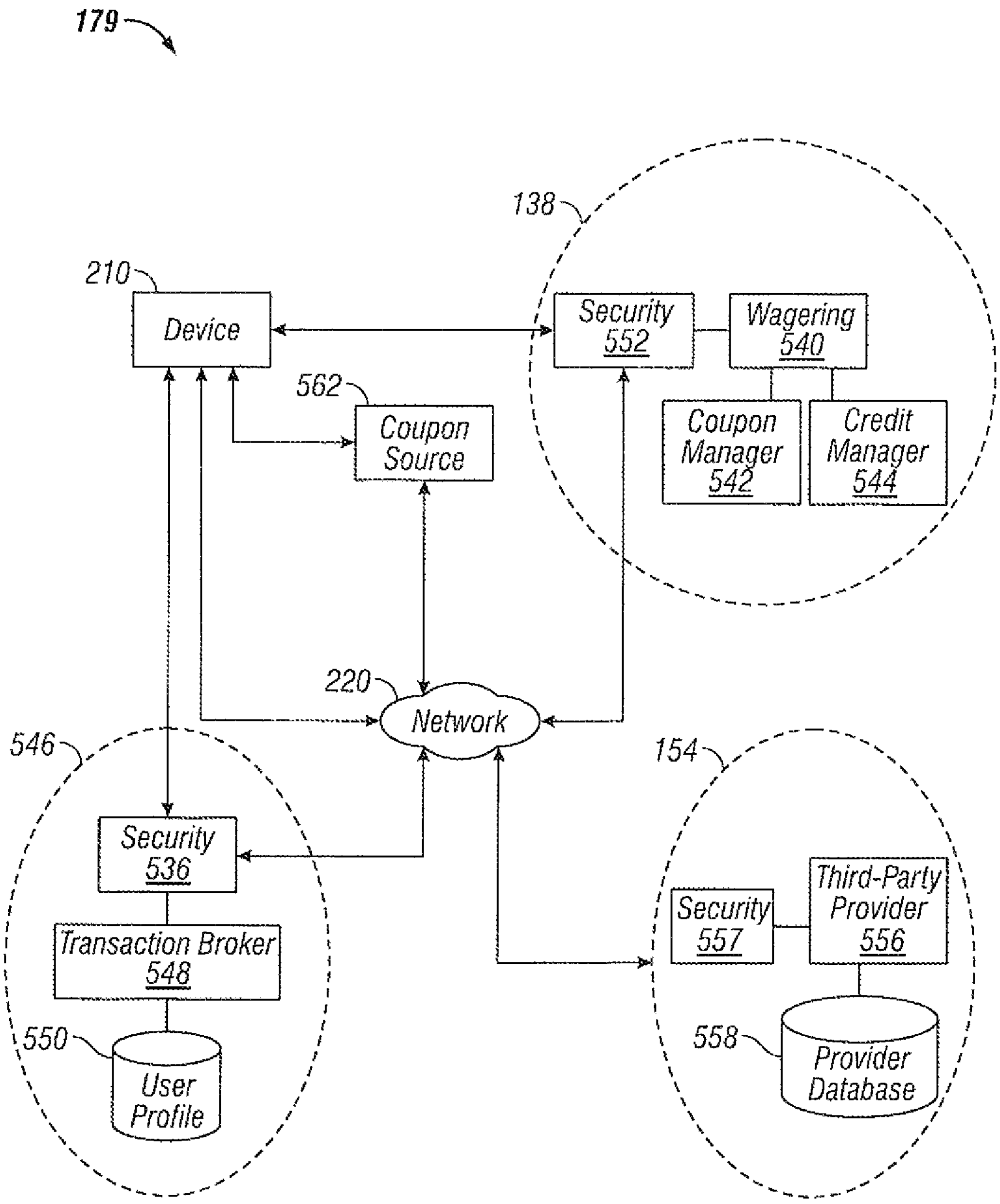
FIG. 5 illustrates a block diagram of a wagering system that includes the commitments or exchange of credits, coupons or electronic cash for a microbet, in accordance with the disclosed embodiments.

FIG. 5 illustrates a block diagram of a wagering system 179 that includes the commitments or exchange of credits, coupons or electronic cash for a microbet, in accordance with the disclosed embodiments. As indicated in FIG. 5, the remote computing device 210 can communicate with network 220, which can also communicate with a coupon source 562. Thus, the computing device 210 can retrieve and store electronic coupons for use in wagering and placing micro-bets as disclosed herein. Note that the coupon source 562 can be configured as a web site from which coupon and credit data may be retrieved. Such a web site can be associated with a transaction broker 548 and/or a third-party provider 556 and/or a wagering manager 540. Note that the wagering manager 540 may be associated with or include the use of a coupon manager 542 and a credit manager 544. A security module 552 permits access and/or communications to the wagering manager 540. Similarly, a security module 557 permits access and/or communications with the third-party provider 556, which in turn can communicate with a provider database 558. A security module 536 can communicate with a transaction broker 548 that in turn includes or is associated with a user profile database 550.

Figure 6:
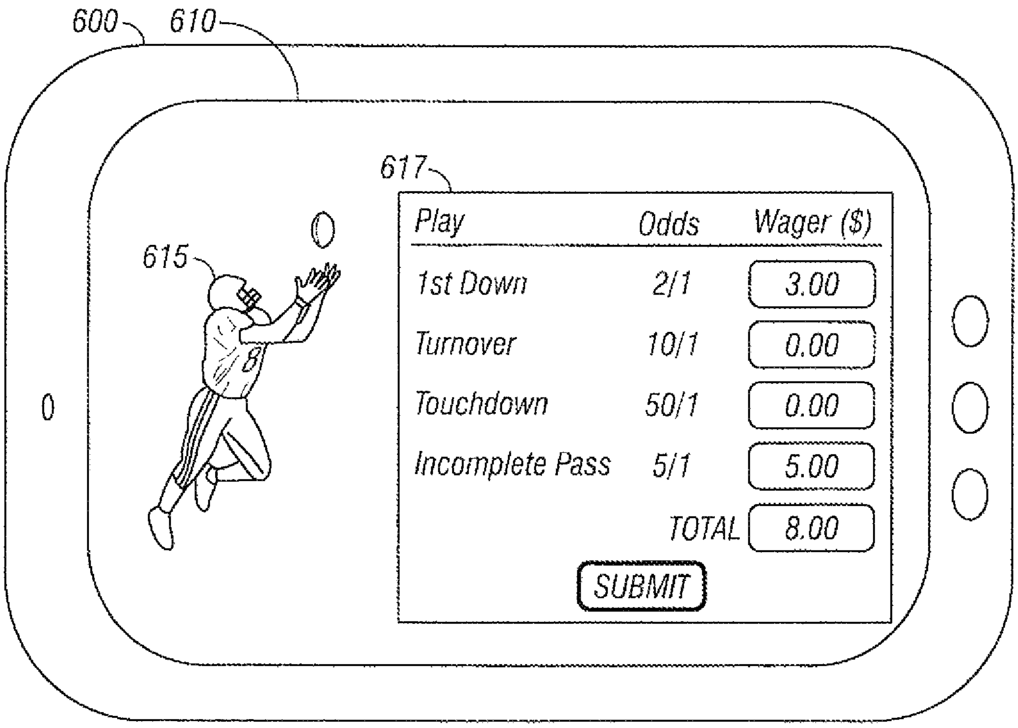
FIG. 6 illustrates a display showing both game video and wagering data, in accordance with the disclosed embodiments.

Referring to FIG. 6, a video display screen 610 is shown integrated within a remote device 600. Ideally, the video display screen 610 can support the viewing of a macro-event activity 615 as well as micro event gaming data 617 on the video display screen 610. The video display screen can also be touch-sensitive to provide a touch screen interface for users to place bets when the remote device is a handheld device. With large screens associated with remote devices 600, macro-event video can be shown simultaneously with micro-bet wagering data, such as tallies, histories and pending micro-bets. As an example, a picture-in-picture display can enable simultaneous viewing of disparate data (macro-event video and wagering data).

It is an aspect of the disclosed invention that a video display on the remote device provide wagering data and input fields accessible by a remote device user and a user interface on the remote device enable user interaction with wagering input fields by a remote device user.

Figure 7:
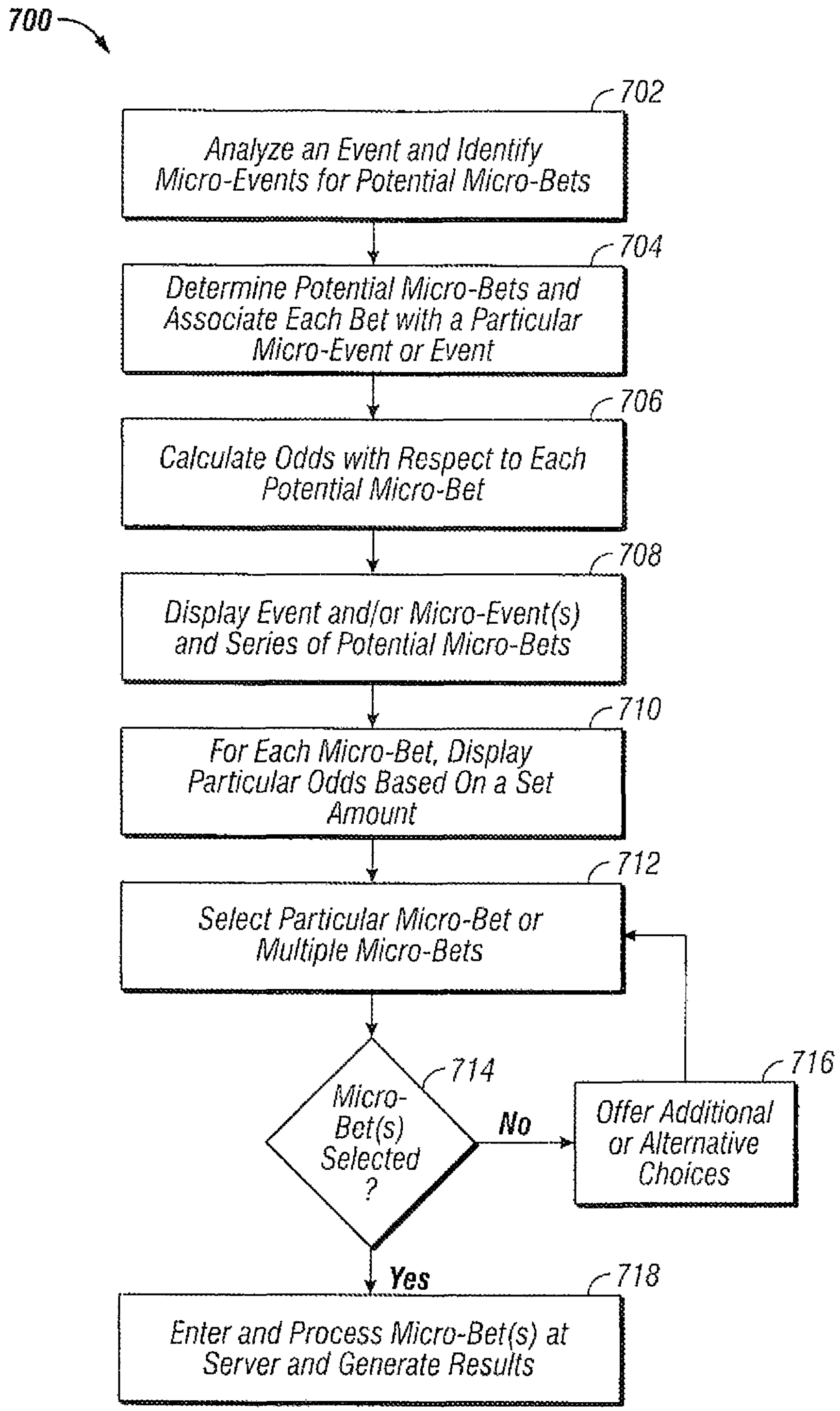
FIG. 7 illustrates a high-level flow chart of operations depicting a method for wagering, in accordance with the disclosed embodiments.

FIG. 7 illustrates a high-level flow chart of operations depicting a method 700 for wagering, in accordance with the disclosed embodiments. As illustrated at block 702, an operation can be implemented in which a macro-event, such as a sporting event is analyzed and micro-events within the macro-event analyzed for potential micro-bets. Note that a micro-event can be an event as "small" as, for example, the next pitch in a baseball game (i.e., the macro-event) is a strike or a ball (i.e. the micro-outcome), the player in a basketball game (i.e. the macro-event) makes a free throw (i.e. the micro-outcome), the next play in a football game (i.e. the macro-event) is a pass or run (i.e. the micro-outcome), or an individual participant reaches certain cumulative micro-outcomes (e.g., yards gained, passes completed, hits, points, etc.) in a set period during or at the end of the entire macro-event (e.g., baseball game, football game, etc.).

Following processing of the operation depicted at block 704, potential micro-bets (e.g., an individual bet or a group of bets on one or more micro-outcomes) can be determined and each micro-bet associated with a particular micro-outcome within the macro-event or with, for example, the cumulative performance of one or more participants in the macro-event (or segments of the macro-event). Thereafter, as described at block 706, the odds can be calculated with respect to each of the potential micro-bets determined (i.e., from block 704). Next, as depicted at block 708, the micro-outcome and/or the micro-event(s) can be displayed (e.g., a live video feed, video replay, etc.) via a display such as, for example, the video display screen 610 shown in FIG. 6, the user interface 244, etc. As indicated at block 708, the micro-bets (e.g., a series of potential micro-bets) can also be displayed via such a display and in association with such video of the macro-event and/or including the particular micro-events (discreet and/or cumulative) associated with respective micro-bets. Additionally, as illustrated at block 710, for each micro-bet, particular odds based on a set amount can be displayed via a display such as the display screen 610, the user interface 244, etc. Next, as indicated at block 712, a particular micro-bet and/or multiple micro-bets can be selected via, for example, a user interface such as, for example, the user interface 244.

Thereafter, as depicted at block 714 a test can be processed to determine if a selection of a micro-bet or a group of micro-bets has been made. If so, then as indicated at block 718, the micro-bet(s) can be automatically entered and processed via, for example, a server (e.g., server 240, server 245, etc.), and results then generated. If it is determined, however, that a selection has not been made, then as indicated at block 716, additional or alternative choices (e.g., other/new micro-bets associated with particular micro-outcomes) can be offered for selection.

Based on the foregoing, it is clear that a micro-outcome can result using discreet verifiable actions as small as whether the next pitch in a baseball game is a strike or ball, the player in a basketball game makes the free throw, the next play in a football game is a pass or run, the next play in a football game gains more or less than 5 yards, results in a fumble, interception or penalty, etc. Also, the user can be presented with a display via display screen of multiple choices of micro-bets, each of which displays the odds if he or she wins. For example, in a football game macro-event, the display screen 610 can display the game (e.g., video) and above that video, a series of potential micro-bets (e.g., pass, run, turnover, touchdown, gain 10+, gain less than 5, lose yards, sack, etc.).

For each potential micro-bet, the user can view his or her odds if the user bets $1, for example, or some other set amount. For instance, it might be 15 to 1 that an interception will be thrown, but 1 to 1 if it will be a running play. The user can "click" (i.e., select) the micro-bet or multiple micro-bets he or she desires, and as long as this bet is entered in the server (e.g., server 240, server 245, etc.) before the play is displayed, the user is "in the action" so to speak. If the player does not like any of those bets, he or she can click or hit a graphically displayed button displayed via the display screen and be given additional choices. The priority of available micro-bets can be established in several ways, including prioritizing based on the popularity of the bets with the current participants, the lowest or highest odds prioritized, the participants history or customized to the participants preferences.

The disclosed embodiments thus relate to method and systems for providing micro-bet options for each micro-event and a running tally thereof. For example, each play in a game provides an opportunity for a new set of micro-betting choices. The disclose embodiments are thus not focused on the concept of the user betting prior to the macro-event that a particular player will achieve some result (e.g., hit a home run during the game), but rather allows a user at any time during the game and prior to the micro-outcome that the micro-outcome will occur. In addition, the user can place a micro-bet that the batter currently up to the plate will hit a home run or a triple or a double or a single or walk or get hit by a pitch or each on a passed ball or fly out or ground out. These real time micro-bets are available with real time parimutuel (or non-parimutuel) odds, as an at bat is a micro-event that will result in a micro-outcome that is objectively verifiable by reference to statistics kept by a neutral third party. The user literally can place, for example, hundreds of verifiable bets on micro-outcomes during a macro-event via such an approach.

There are already bets that can be placed before an event starts on game scores, scores after quarters, halftime scores, scores after a certain number of innings, etc. There are already bets available on whether, for example, a particular baseball player will hit a home run in a game. There are no bets available, however, where even after a macro-event starts a particular baseball player will hit a home run, much less a system where a bet can be placed in real time on whether a certain micro-outcome will occur during a specific at bat, or even a particular pitch. This is a key difference between the disclosed embodiments and prior art implementations. The disclosed embodiments thus provide for a "bet/play as you watch, dynamic, parimutuel (or non-parimutuel) game" where each possible situation, or micro-event in a larger game enables multiple betting options on micro-event outcomes even after the macro-event starts. Such an approach is outlined herein with respect to FIG. 8.

Figure 8:
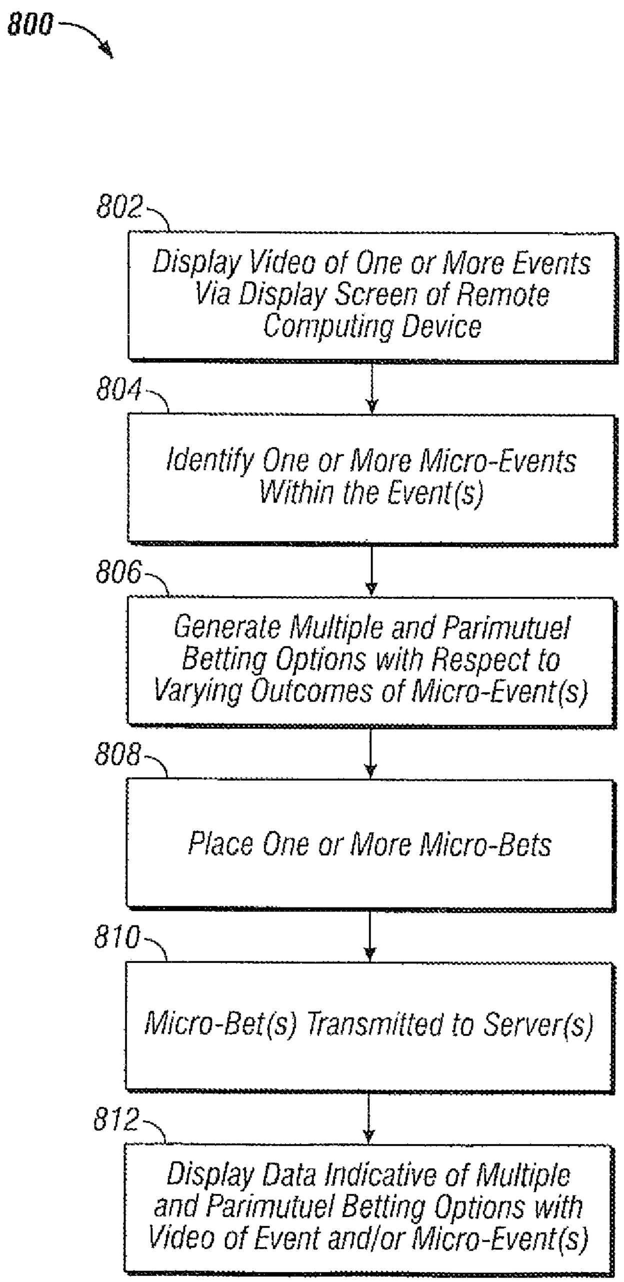
FIG. 8 illustrates a high-level flow chart of operations depicting a method for pacing a micro-bet with respect to multiple and parimutuel and/or non-parimutuel betting options, in accordance with the disclosed embodiments.

FIG. 8 illustrates a high-level flow chart of operations depicting a method 800 for pacing a micro-bet with respect to multiple betting options (e.g., parimutuel and/or non-parimutuel), in accordance with the disclosed embodiments. The operations indicated in FIG. 8 thus related to a method 800 for micro-betting. As illustrated at block 802, an operation can be implemented for displaying video one or more macro-events via a display screen associated with and/or integrated with a remote computing device, such as, for example, the remote computing device 210 discussed earlier herein.

Thereafter, as indicated at block 804, an operation can be implemented for identifying one or more micro-event within the macro-event or macro-events displayed via a display screen of, for example, the remote computing device 210. Next, as depicted at block 806, an operation can be implemented for generating multiple and parimutuel betting options with respect to varying micro-outcomes within the identified macro-event or macro-events. Note that although the discussion herein refers to "parimutuel betting" it can be appreciated that non-parimutuel betting options can be implemented in accordance with alternative embodiments. Thereafter, as described at block 808, an operation can be implemented for placing via the remote computing device, one or more micro-bets among the multiple and parimutuel (or non-parimutuel) betting options with respect to the micro-outcomes (discrete and cumulative) via a data network in communication with the remote computing device.

Then, as depicted at block 810, the micro-bet or micro-bets can be transmitted from the remote computing device for placement via one or more servers (e.g., servers 240, 245, etc.) in communication with the network. Thereafter, as illustrated at block 812, an operation can be implemented for displaying the data indicative of the multiple and parimutuel (or non-parimutuel) betting options via the display screen of the remote computing device in association with the video of the macro-event or macro-events displayed via the display screen.

Figure 9:
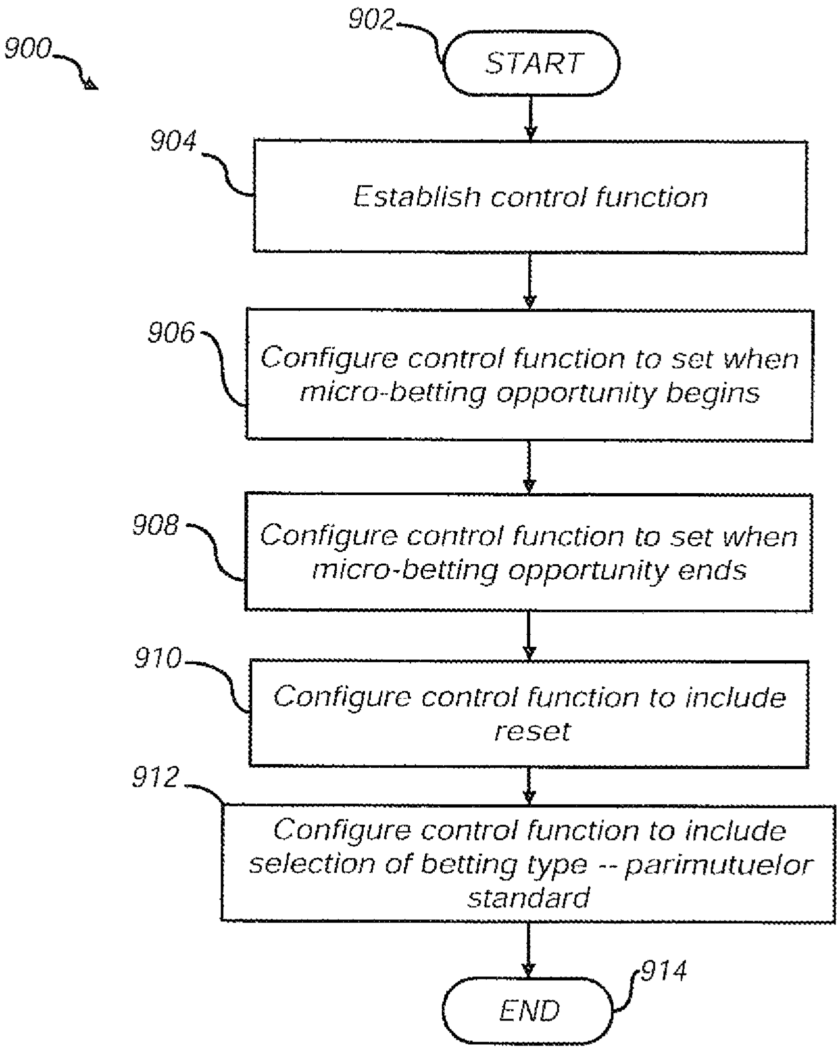
FIG. 9 illustrates a high-level flow chart of operations depicting a method for configuring a control function for setting micro-bets, in accordance with the disclosed embodiments.

FIG. 9 illustrates a high-level flow chart of operations depicting a method 900 for configuring a control function 901 (see FIGS. 10-11) for setting micro-bets, in accordance with the disclosed embodiments.

Figure 10:
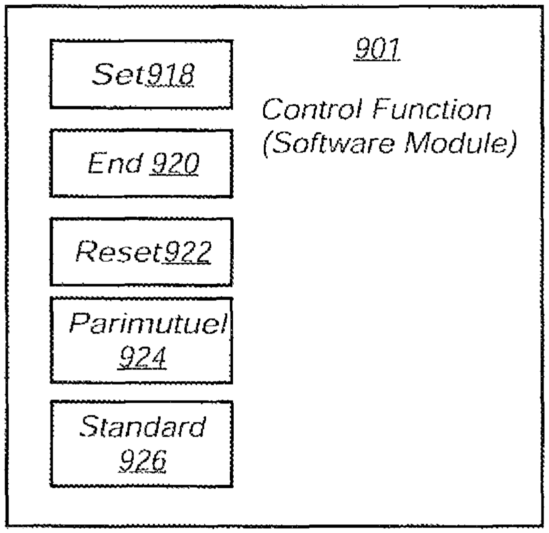
FIG. 10 illustrates a block diagram of a control function module for selecting micro-bets, in accordance with the disclosed embodiments.

FIG. 10 illustrates a block diagram of the control function 901 for setting micro-bets, in accordance with the disclosed embodiments. Note that as indicated in FIG. 10, particular sub-modules (software modules) are shown with respect to the control function 901 (which is also preferably implemented as a software module). These sub-modules include, for example, a module 918 for setting when a micro-betting opportunity begins and a module 920 for designating when a micro-betting opportunity ends. Module 922 can "reset" a micro-betting opportunity and be provide with new micro-betting opportunities as discussed further herein (and in particular in FIG. 7, block 716), and modules 924 and 926 respectively implement parimutuel or standard (e.g., non-parimutuel) betting. It can be appreciated, of course that other types of sub-modules may be utilized in the context of control function 901 to provide other control functionalities.

Figure 11:
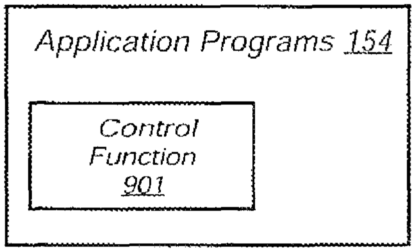
FIG. 11 illustrates a block diagram of application programs, including a control function module, in accordance with the disclosed embodiments.

FIG. 11 illustrates a block diagram of application programs 154, including control function 901, in accordance with the disclosed embodiments. Note that in a preferred embodiment, the application programs 154 shown in FIG. 11 can include, for example, the control function 901 (module), along with the modules 122, 124, 126, etc. shown in FIG. 1.

As indicated at block 902 in FIG. 9, the overall process of method 900 begins. Then, as indicated at block 904, the control function 901 (e.g., a software module and/or a hardware module) can be established and then, as illustrated at block 906, the control function 901 can be configured to set when a micro-betting opportunity begins (e.g., module 918 in FIG. 10). Similarly, as depicted at block 908, the control function 901 can be configured to set when the micro-betting opportunity ends (e.g., module 920 in FIG. 10). Next, as illustrated at block 910, the control function 901 can be configured to include a reset operation (e.g., module 922 in FIG. 10). Then, as illustrated at block 912, the control function 901 can be configured to include selection of a betting type, including, for example, parimutuel or standard betting operations (e.g., modules 924, 926 in FIG. 10).

For a micro-bet to take place, the control function 901 (or control mechanism) can be utilized to designate when a micro-betting opportunity begins and ends. For example, if one is betting in baseball on the outcome of a pitch, there has to be some way for the better to know when he or she can place the bet and when the bet is no longer available. One possible solution involves having a person controlling the availability of the betting by hitting a "reset" so that the current series of micro-bets are "set" and no more bets can be placed. This could involve an active human controller utilizing a control mechanism such as the control function 901.

In the aforementioned baseball example, there would be a series of bets offered for a certain situation, such as an at bat. The series of bets would be, for example, "hit, ball, strike, error, hit by pitch, wild pitch, passed ball, foul ball, foul out, ground out, fly out, bunt, pick-off attempt, pick-off or walk." These betting options can be displayed on a display screen and become available for selection via a "reset" by the human controller. When the pitcher becomes available, for example, the human controller can "hit" or select a graphically displayed "set" button, thereby freezing all bets. The outcome of that pitch micro-event occurs, and a re-set button can be hit, allowing the next set of micro-bets to become available.

For this type of micro-betting (e.g., what happens in an individual at bat on a per pitch basis), the action does not need to be parimutuel, though it can. Hence, as indicated in block 912 of FIG. 9, various types of betting schemes (e.g., parimutuel, non-parimutuel/standard, etc.) can be available. The particular type of event prediction can be accomplished by, for example, simply utilizing odds calculations and the house can therefore take the risk that someone gets lucky. The pricing of the bets can just be set via the control mechanism 901 so the odds are that in the long run, for example, the house will win.

Such features would find particularly useful application in the context of, for example, a casino sports book. A sports book manager or sports book personnel can, for example, sit in a sports book booth and control the availability of micro-betting on a game being televised in the sports book and the gamblers sit there and bet on every play as they watch. In some situations "little" booths may be in the sports book where a better can watch a game and on a screen next to it, micro-bets are constantly made available with respect to that game. The gambler or user thus watches on one screen and bets on the other. Second screen implementation can also occur in the privacy of a den or living room where event video is being displayed on a large flat panel monitor, but microgaming is taking place on a hand held computer such as a tablet or smartphone.

Figure 12:
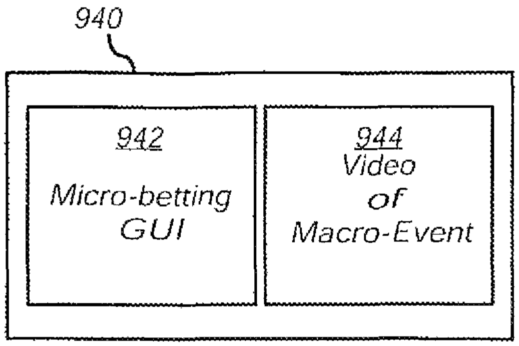
FIG. 12 illustrates a block diagram of a multiple display screen system, which can be utilized for placing micro-bets, in accordance with the disclosed embodiments.

FIG. 12 illustrates a block diagram of a multiple display screen system 940, which can be utilized for placing micro-bets, in accordance with the disclosed embodiments. The multiple display screen system 940 can be implemented as a device or system which contains two display screens or display areas, such as displays 942 and 944. Display screen 942 can display a micro-betting GUI 942 and display screen 944 can display live video (or non-live video) of a macro-event (or multiple macro-events). Note that although two display areas 942 and 944 are shown in FIG. 12, and together form a dual display screen system, it can be appreciated that multiple display screens may be implemented in accordance with alternative embodiments.

It may be a violation of NFL and other sports' copyrights without license or permission to have the bets literally over-layed on the same screen as the available micro-bets. To overcome this possibility, the multiple graphic display system 940 can be implemented to provide for a graphic display of the bets that are synchronized to the televised game, but not on the same screen. Such a system can enable a better to watch the game on his or her television or computer, and then on another screen, either a picture in picture, dual windows or two different devices, and have his or her micro-betting opportunities appear for selection. One day the sporting leagues might allow micro-betting as an overlay, but until they do, the system 940 can be implemented, which allows the micro-betting GUI 942 to be simply synchronized to the macro-event itself (so people can bet while just listening), and synchronized to the video of the macro-event, but does not have to appear on the same screen.

Figure 13:
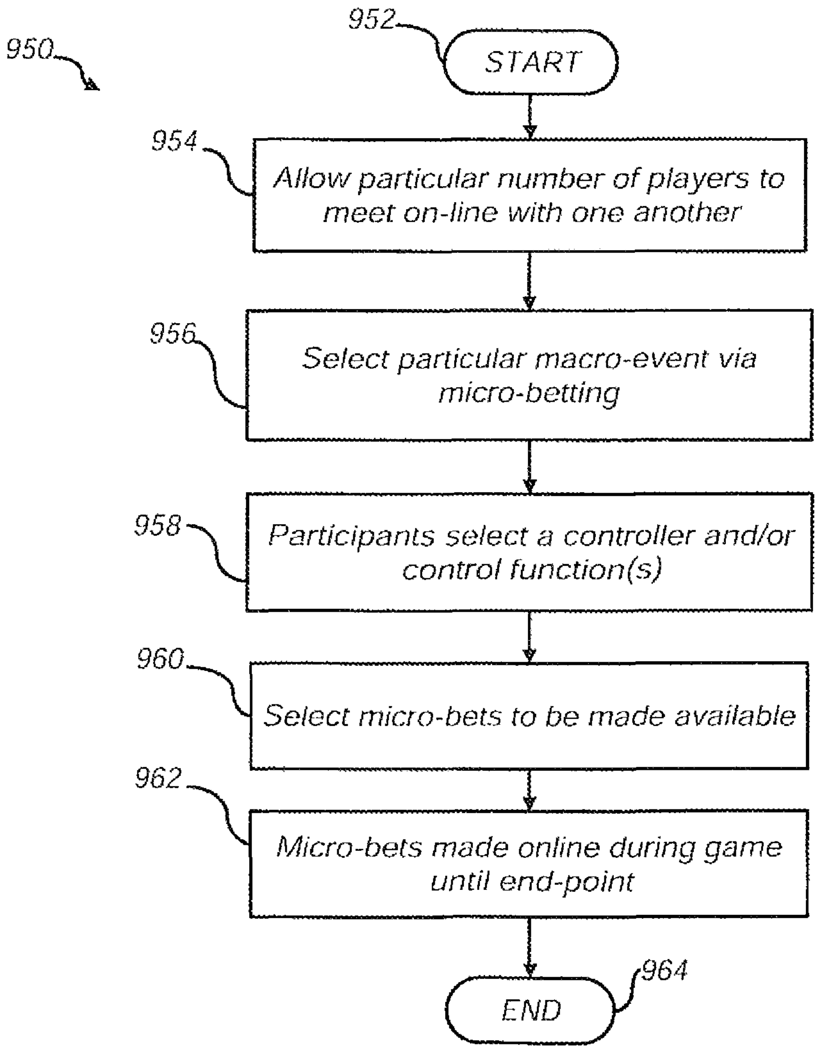
FIG. 13 illustrates a high-level flow chart of operations depicting logical operational steps of a method for on-line competition and micro-bets, thereof in accordance with the disclosed embodiments.

FIG. 13 illustrates a high-level flow chart of operations depicting logical operational steps of a method 950 for online competition and micro-bets, thereof in accordance with a the disclosed embodiments. Note that as utilized herein the term "online" refers generally to connected to a computer network or accessible by computer, such as in, for example, an "online database" or an "online community" or an "online social network". Method 950 and systems thereof allow a group of people to play one another online for a "pot", as in for example, video poker. In the "real world", six, eight or ten people can sit at a poke table and gamble with one another. Utilizing the approach of method 950 and systems thereof, a set number of people can select to meet with one another online to compete on a macro-event using the micro-betting approach described herein.

For example, suppose that eight Dallas Cowboys fans would meet online to micro-bet while watching the Cowboys play the Redskins. The participants can pick a controller (set or rotating among them under some rule scheme), pick the micro-bets they wanted to make available (for all or part of the session, perhaps allowing the rotating controller to pick the micro-bets to be made available), and then play one another until some set end-point. The end-point can be, for example, when one person wins all of a pre-set pot, when the macro-event is over, or some other criteria to determine an end. This again would be appropriate for building an online community, for a casino sports book or the betters can enter a "controlled" game where the "house" is the controller and all of the players simply played the house, or the house controlled and took a vig on each round of bets in exchange for performing the controlling function for the participants. Note that the term "house in this context refers generally to the management of a gambling house or casino.

Thus, as indicate at block 952, the process of method 950 begins. Next, as depicted at block 954, an operation can be implemented in which a particular number of players is allowed to meet online with one another. Examples of online meetings include those offered by Internet social networks and so forth. Thereafter, as illustrated at block 956, an operation can be implemented to select a particular macro-event for micro-betting via the micro-betting approach disclosed herein. Next, as described at block 958, the participants in the online meeting can select a controller (e.g., a human controller of the control function 901 described earlier) and/or control functions (e.g., control functions offered by the control function 901). Next, as depicted at block 960, an operation can be implemented to select micro-bets to be made available for micro-betting. Next, as illustrated at block 962, one or more micro-bets can be made online by one or more of the participants during the online game or competition until the end-point described earlier.

It will be understood that the circuits and other means supported by each block and combinations of blocks can be implemented by special purpose hardware, software or firmware operating on special or general-purpose data processors, or combinations thereof. It should also be noted that, in some alternative implementations, the operations noted in the blocks may occur out of the order noted in the figures. For example, two blocks shown in succession may, in fact, be executed substantially concurrently, or the blocks may sometimes be executed in the reverse order. The systems and methods described herein can use what is referred to as advanced analytics over data and statistics occurring during a live sporting event for developing microgaming opportunities in accordance with teaching of the present invention. Data derived from the advanced analytics can also be provided without the requirement of betting for information purposes to users.

An option can be introduced to prevent cheating with respect to the disclosed embodiments. Such an option involves randomizing (or somewhat randomizing) available micro-bets. For example, in the context of an interactive Casino Sports Book, a number of terminals may be available for micro-betters to sit and watch the micro-event (e.g., a Cowboys vs. Redskins football game). In such a situation, the casino controller can hit "reset" after every micro-event to lock in the results of the prior micro-bets and also bring up a choice of new micro-bets. Reset can also bypass the current offering if not acceptable to the betters, and bring up new options. The controller, however, would have a choice of what micro-bets to offer the betters. The choice could be, for example, a set of defensive bets (e.g., tackle for loss, sack, interception, fumble, blocked kick, etc.) or offensive bets (e.g., run, pass, touchdown, etc.) or neutral bets (e.g., penalty, time out, injury stoppage, etc.). To keep a player (e.g., Tony Romo) from cheating with a micro-better (e.g., knowing he is going to pass on the 3rd play), the controller—either a person or a computer—can randomly change the selections of what micro-bets are available from play to play, or even do so non-randomly, such as when the situation is 3rd and 8, make sure the micro-bets available are different from the last time the situation was third and 8. Thus, by changing the micro-bets available in a manner that the players and betters would not be able to predict takes almost any chance of cheating out of the game.

Based on the foregoing, it can be appreciated that in some embodiments, a method can be implemented for micro-betting. Such a method may include, for example, the steps of electronically placing at least one micro-bet with respect to at least one micro-event associated with an event during a round of micro-betting; and managing and controlling the at least one wager with respect to the at least one micro-bet during the round of micro-betting. In other embodiments, the step of managing and controlling the at least one wager with respect to the at least one micro-bet during the round of micro-betting, can further include a step of managing and controlling, remote from electronically placing the at least one micro-bet, the at least one wager with respect to the at least one micro-bet during the round of micro-betting. In still other embodiments, a step can be provided for automatically obtaining a portion of a profit with respect to the round of micro-bets in exchange for the managing and controlling the at least one wager with respect to the at least one micro-bet during the round of micro-betting.

In still other embodiments, the step of managing and controlling the at least one wager with respect to the at least one micro-bet during the round of micro-betting, can further include the step of managing and controlling via a sports book, the at least one wager with respect to the at least one micro-bet during the round of micro-betting. In yet other embodiments, the step of managing and controlling the at least one wager with respect to the at least one micro-bet during the round of micro-betting, can further include the step of managing and controlling via a controller, the at least one wager with respect to the at least one micro-bet during the round of micro-betting. In another embodiment, the step of electronically placing the at least one micro-bet with respect to the at least one micro-event associated with the event during the round of micro-betting, can include the step of electronically placing via a wireless terminal (e.g., communications device 210 may be such a wireless terminal), the at least one micro-bet with respect to the at least one micro-event associated with the event during the round of micro-betting. Additionally, as indicated herein, in the wireless terminal, can be for example, a Smartphone (e.g., iPhone, Android Phone, Blackberry), another hand held device such as, for example, a tablet computing device (e.g., iPad, etc.), a personal computer such as a desktop computer, a laptop computer, etc.

In still another embodiment, the step of electronically placing the at least one micro-bet with respect to the at least one micro-event associated with the event during the round of micro-betting, can further comprise the step of electronically placing via a remote computer network, the at least one micro-bet with respect to the at least one micro-event associated with the event during the round of micro-betting. In yet another embodiment, the step of electronically placing the at least one micro-bet with respect to the at least one micro-event associated with the event during the round of micro-betting, can include the step of electronically placing via a wireless network, the at least one micro-bet with respect to the at least one micro-event associated with the event during the round of micro-betting.

In another embodiment, a method for micro-betting can be implemented, which includes the steps of, for example, electronically placing at least one micro-bet with respect to at least one micro-event associated with an event during a round of micro-betting; managing and controlling the at least one wager with respect to the at least one micro-bet during the round of micro-betting; and automatically obtaining a portion of a profit with respect to the round of micro-bets in exchange for the managing and controlling the at least one wager with respect to the at least one micro-bet during the round of micro-betting. In another embodiment, the step of electronically placing the at least one micro-bet with respect to the at least one micro-event associated with the event during the round of micro-betting, can further include the step of electronically placing via a wireless terminal, the at least one micro-bet with respect to the at least one micro-event associated with the event during the round of micro-betting.

In still another embodiment, a system for micro-betting can include, for example, a processor, and a data bus coupled to the processor. Such a system may also include a computer-usable medium embodying computer code, the computer-usable medium being coupled to the data bus, the computer program code comprising instructions executable by the processor. Such instructions may be configured to, for example, electronically place at least one micro-bet with respect to at least one micro-event associated with an event during a round of micro-betting; and manage and control the at least one wager with respect to the at least one micro-bet during the round of micro-betting.

In another embodiment, such instructions can be further configured for managing and controlling, remote from electronically placing the at least one micro-bet, the at least one wager with respect to the at least one micro-bet during the round of micro-betting. In still another embodiment, such instructions can be further configured for automatically obtaining a portion of a profit with respect to the round of micro-bets in exchange for the managing and controlling the at least one wager with respect to the at least one micro-bet during the round of micro-betting. In still another embodiment, such instructions can be further configured for managing and controlling via a sports book, the at least one wager with respect to the at least one micro-bet during the round of micro-betting. In yet another embodiment, such instructions can be configured for managing and controlling via a controller, the at least one wager with respect to the at least one micro-bet during the round of micro-betting. In another embodiment, such instructions can be configured for electronically placing via a wireless terminal, the at least one micro-bet with respect to the at least one micro-event associated with the event during the round of micro-betting. Note that as indicated previously such a wireless terminal may be hand held device such as a smartphone (e.g., iphone, Android Phone, Blackberry, etc.), a PDA (Personal Digital Assistant), a computing table (e.g., iPad), a desktop computer, a laptop computer, etc.

In another embodiment, such instructions can be further configured for electronically placing via a remote computer network, the at least one micro-bet with respect to the at least one micro-event associated with the event during the round of micro-betting. In yet another embodiment, such instructions can be further configured for electronically placing via a wireless network, the at least one micro-bet with respect to the at least one micro-event associated with the event during the round of micro-betting.

In accordance with features of the present invention, systems and methods allow users of portable device to securely wager on events of a competitive entertainment event occurring in a gaming environment, such as a casino or sports venue, via access through beacons deployed throughout the venue to a network server managing secure wagering.

In accordance with features of the present invention, users of portable device to securely wager on events of a competitive entertainment event occurring in a gaming environment, such as a casino or sports venue, via access to a network server managing secure wagering where images of data are displayed on data-enabled glasses (e.g., Google-Glass, etc.). It is another aspect of the disclosed embodiments to provide for systems and methods that allow users of portable device to securely wager on events of a competitive entertainment event occurring in a gaming environment, such as a casino or sports venue, via access through secure transponders deployed throughout a venue to a network server managing secure wagering wherein images of data are displayed on data-enabled glasses (e.g., Google-Glass, etc.) with data from at least one of a portable electronic device (e.g., smartphone or tablet computer) carried by a user or directly from secure transponders. Google glasses can be used to view data (bets, scores, status, video) while watching the live venue or while the event is playing on a big screen. The user will still place bets on a tablet or smartphone, that is also in data communication with the Google glasses. Google glasses are going to be hot wearable technology in the near future and will most certainly be used for everything including our micro-gaming application and within sports venues.

It should be appreciated that concepts of systems and methods for microgaming and microbetting disclosed can be used in association with computer games (e.g., like Madden NFL, FIFA Soccer/Football, and even Call of Duty). The venue would be virtual but the play would be just as real. Since many gamers play interactively over a network, they can place bets and microbets with each other during the game to enhance play. And the game can accompany or a real game, thereby permitting gamers to expand upon reality (e.g., simulate outcomes if different plays were run). Also, the computer game can be used as a platform for receiving other betting opportunities (from other real ongoing games, from other ongoing video games, etc.) during play. Another features would be to add microbetting to fantasy platforms, such as Yahoo! Fantasy Baseball. In the cases where computer games are the event, the remote devices can still include desktop computers, laptop computers, set-top boxes, gaming consoles, Internet-enabled High Definition Televisions Sets (HDTVs) and portable wireless handheld devices such as Smartphones, PDAs (Personal Digital Assistants) and proprietary portable devices rented to users at a venue.

Authentication of users of remote devices including portable devices can including requiring user entry of any combination of user name, user information, user age, passwords, biometrics, security codes to enable registration and secure access to gaming services provided by servers brokering wagers on micro-events. Authentication can include determination the user's location based on the device's GPS location or its communication of a with a network to assure that the user is allowed to engage in gaming from the determined location. Authentication based on the location of a mobile or portable electronic device (e.g., smartphone, tablet, wearable device such as "Google-Glass" or similar data enabled eyeglasses or eyewear) can determine if user is allowed to engage in microgaming.

Location can be determined by GPS or utilizing network access information, such as IP addresses, or triangulation based on device communication with cellular antennae's. A user's age call also be determined and then the user authenticated during subsequent sessions. Authentication of age can be based on biometrics read from a user, where biometrics can be obtained during initial set up when user age can be confirmed in person or remotely by gaming authorities or other controlling parties. Authorization of user to engage in microgaming can be determined based on age, location, applicable law for a given location, betting limits, and other established gaming rules.

Features of the invention can include providing users of portable device and/or data-enabled glasses with advertisement, incentives or coupons and can include an offer of an incentive or coupon to submit a wager on certain riskier (e.g., "long shot") events of a competitive entertainment event occurring in a gaming environment, and the incentives or coupons can be redeemed in a venue where the user is betting such as a casino or sports venue.

Users of portable device and/or data-enabled glasses can be provided with advertisement, incentives or coupons based on the users location in a venue as determined by beacons deployed throughout the venue, and the user can be directed to a location for redemption of the coupons or incentive via assistance of the beacons, and the beacons can operate using Bluetooth low energy or other 2.4 MHZ, or equivalent, bi-directional data communications within the venue. Beacons can help guide a gamer to an incentive that can be provided to him in order for him agree to take a riskier bet (e.g., enticing a better to wager on a risky bet by offering a free coke or burger, or something like that). In a sports venue, it would be helpful to help direct the better to the prize, or help a concession worker deliver the prize to the gamer based on his location as determined by beacons deployed throughout the venue and the gamer's device being registered on the venue system including the network of beacons.

A microbetting system can include the incorporation of advertisements, links to other sites, coupons, and other promotional materials also available on the screen. The microbetting system that includes an ability to tie certain bets to incentives to make that bet. For example, in a football game, to encourage betters to make long-shot bets, the application can offer coupons or other incentives. If you bet on "fumble recovered by defense" (normally a long shot bet) you will receive a coupon for a free drink or a Big Mac or some other sponsored goodie.

It will be appreciated that variations of the above-disclosed and other features and functions, or alternatives thereof, may be desirably combined into many other different systems or applications. For example, it can be appreciated that the betting approach disclosed herein does not have to be parimutuel, but can also be implemented as betting in which odds are set by a controller (e.g., sort of "house odds). That is, "parimutuel" is just one particular betting approach, but not the only betting system or approach that can be utilized in accordance with the disclosed embodiments.

It is, therefore, an aspect of the disclosed embodiments to provide methods and systems that allow users of remote communication and display devices (e.g., smartphones, tablet computing devices, laptop computers, home computers, servers, etc.) to view gaming event information, including any of video, statistics and online betting options, and also enable betting based on the location of the user and other parameters.

In one embodiment, a GPS-based or other location detection based method and system can be implemented, wherein when a user logs onto the system from a location using a mobile device (e.g., tablet, laptop, smart phone, Wi-Fi enabled computer, etc.), the location of the user is determined and sent to the system so that the system is aware of where the user is located. Based on that location, the system knows (1) whether use of the system is legal/allowed in that jurisdiction; (2) if legal/allowed, what limits exist in that location on the types/amounts of bets as prescribed by laws and regulations; and (3) based on those prescribed limits, the options presented to the user are conformed to the laws and regulations that apply.

In another embodiment, a GPS-based or other location detection based method and system can be implemented wherein when a user logs onto the system from a location using a mobile device (e.g., tablet, laptop, smart phone, Wi-Fi enabled computer, etc.), the location of the user is sent to the system so that the system knows where the user is located. Based on that location, the system will know (1) what the requirements are for a user to participate in that jurisdiction (age, disclosures/disclaimers that must be presented, notices that must be provided and verified etc.); (2) utilize methods to verify that the user is qualified (e.g., age verification) and; (3) making any necessary reports or disclosures that the proper notices were provided and verified to have been read, understood and agreed upon by the user to ensure a user is qualified to participate.

In yet another embodiment, a GPS-based or other location detection based method and system ca be implemented wherein when a user logs onto the system from a location using a mobile device (e.g., tablet, laptop, smart phone, Wi-Fi enabled computer, etc.), the location of the user is sent to the system so it knows where the user is located. Based on that location, the system will know (1) whether use of the system is taxed in that jurisdiction; (2) if taxed, the system will calculate the user's taxes or the system owner's taxes and ensure that the taxes are properly accounted for any paid, either by deducting the taxes from the user's account or ensuring that the system operator's taxes are reported In another embodiment, at certain random or pre-determined intervals, the user may be required to verify that it (the user) is a person using the system and not a machine.

In yet another embodiment, the GPS based or other location based system can be used to identifying other users who are located in a location that permits gaming with the first user. For example, if the first user initiates a parimutuel betting game within a venue, but gaming is only permitted inside the venue, the GPS-based or other location detection-based system can identify other users located within the venue who can participate in that game.

It should be appreciated that the disclosed embodiments can apply to any form of online gaming using mobile devices and not just micro-betting. "Micro-betting" as discussed herein is for exemplary or illustrative purposes only and is not considered a limiting feature of the disclosed embodiments.

In general, the GPS or other location-based method and system can be e used to choose the correct method to, for example, calculate taxes owed in jurisdictions where gambling is legal and to report/pay those taxes. Such a GPS or other location-based method system can be used to choose from various authorization forms to ensure only persons legally authorized to gamble in a location are allowed access to the site. In addition, such a GPS or other location-based method/system can be used to choose from various available forms of gambling that are legal in the jurisdictions. The disclosed GPS or other location based method/system or service can be employed to authorize particular gambling types (e.g., blackjack, poker, horse racing, sports betting, etc.) that are legal in the jurisdiction. In addition, operations can be implement to impose on the gambling, limits prescribed in the jurisdiction (e.g., amount of bets, amount of losses, number of bets, etc.).

It is another aspect of the disclosed embodiments to provide for systems and methods that allow users of remote devices to wager on events of a competitive entertainment event occurring in a gaming environment via access to a network server over a data network.

It is another aspect of the disclosed embodiments to provide for systems and methods that allow users of portable device to securely wager on events of a competitive entertainment event occurring in a gaming environment, such as a casino or sports venue, via access through transponders deployed throughout the venue to a network server managing secure wagering.

It is another aspect of the disclosed embodiments to provide for systems and methods that allow users of portable device to securely wager on events of a competitive entertainment event occurring in a gaming environment, such as a casino or sports venue, via access to a network server managing secure wagering where images of data are displayed on data-enabled glasses (e.g., GoogleGlass, etc.).

It is another aspect of the disclosed embodiments to provide for systems and methods that allow users of portable device to securely wager on events of a competitive entertainment event occurring in a gaming environment, such as a casino or sports venue, via, for example, access through secure transponders deployed throughout a venue to a network server managing secure wagering wherein images of data are displayed on data-enabled glasses (e.g., Google-Glass, etc.) with data from at least one of a portable electronic device (e.g., smartphone or tablet computer) carried by a user or directly from secure transponders.

It is still a further aspect of the disclosed embodiments to provide methods and systems including the use of Google glasses that can be used to view data (bets, scores, status, video) while watching the live venue or while the event is playing on a big screen. The user will still place bets on a tablet or smartphone, that is also in data communication with the Google glasses. Google glasses are going to be hot wearable technology in the near future and will most certainly be used for everything including gaming applications and within venues such as sports stadiums, casinos, concert halls, and so forth.

It is yet another aspect of the disclose embodiments to provide systems and methods wagering in association with computer games (e.g., like Madden NFL, FIFA Soccer/Football, and even Call of Duty). In such a scenario, the venue would be virtual but the play would be just as real. Since many gamers play interactively over a network, they can place bets and microbets with each other during the game to enhance play. And the game can accompany or a real game, thereby permitting gamers to expand upon reality (e.g., simulate outcomes if different plays were run). Also, the computer game can be used as a platform for receiving other betting opportunities (from other real ongoing games, from other ongoing video games, etc.) during play. Another feature would be to add fantasy platforms, such as Yahoo! Fantasy Baseball.

It is also an aspect of the disclosed embodiments to provide a system for betting on outcomes occurring during an event via computing devices such as smartphones, tablets, laptop computers, personal computers, and so on. Such a system can include a server for brokering wagers occurring during events and at least one remote device in communication with the server requesting placement of wagers occurring during the event.

It is another aspect of the disclosed embodiments that remote devices include desktop computers, laptop computers, set-top boxes, gaming consoles, Internet-enabled High Definition Televisions Sets (HDTVs) and portable wireless handheld devices such as Smartphones, PDAs (Personal Digital Assistants) and proprietary portable devices rented to users at a venue.

It is still another aspect of the disclosed embodiments that wagering includes the commitment or exchange of credits, coupons or electronic cash for a microbet.

It is a further aspect of the disclosed embodiments that communications between remote devices and servers brokering wagers be secured.

It is another aspect of the disclosed embodiments is to authenticate users of portable devices including requiring user entry of any combination of user name, user information, user age, passwords, biometrics, security codes to enable registration and secure access to gaming services provided by servers brokering wagers. Authentication can include in some instances determination of the user's location based on the device's GPS location or its communication of a with a network to assure that the user is allowed to engage in gaming from the determined location.

It is another aspect of the disclosed embodiments is to determine to location of a user based on the location of a portable electronic device (e.g., smartphone or tablet) to determine if user is allowed to engage in microgaming. Location can be determined by GPS or utilizing network access information, such as IP addresses, or triangulation based on device communication with cellular antennae's. A user's age call also be determined and then the user authenticated during subsequent sessions. Authentication of age can be based on biometrics read from a user, where biometrics can be obtained during initial set up when user age can be confirmed in person or remotely by gaming authorities or other controlling parties. Authorization of user to engage in microgaming can be determined based on age, location, applicable law for a given location, betting limits, and other established gaming rules.

In another embodiment, user name and passwords can be utilized to enable registration and secure access to personal accounts and account credit balances stored on servers providing gaming services to remote devices.

In another embodiment, one or more services can be implemented, which include a wagering module for brokering wagers transmit confirmation data via the data network to the remote device (or devices) that a particular bet or wager has been placed.

In still another embodiment, a video display of the remote device can display video from a sports venue, along with player/team information and statistics, and wagering data and input fields accessible by the remote device user.

In another embodiment, a video display on or associated with the remote device can provide wagering data and input fields accessible by a remote device user and a user interface on the remote device enable user interaction with wagering input fields by a remote device user.

Figure 14:
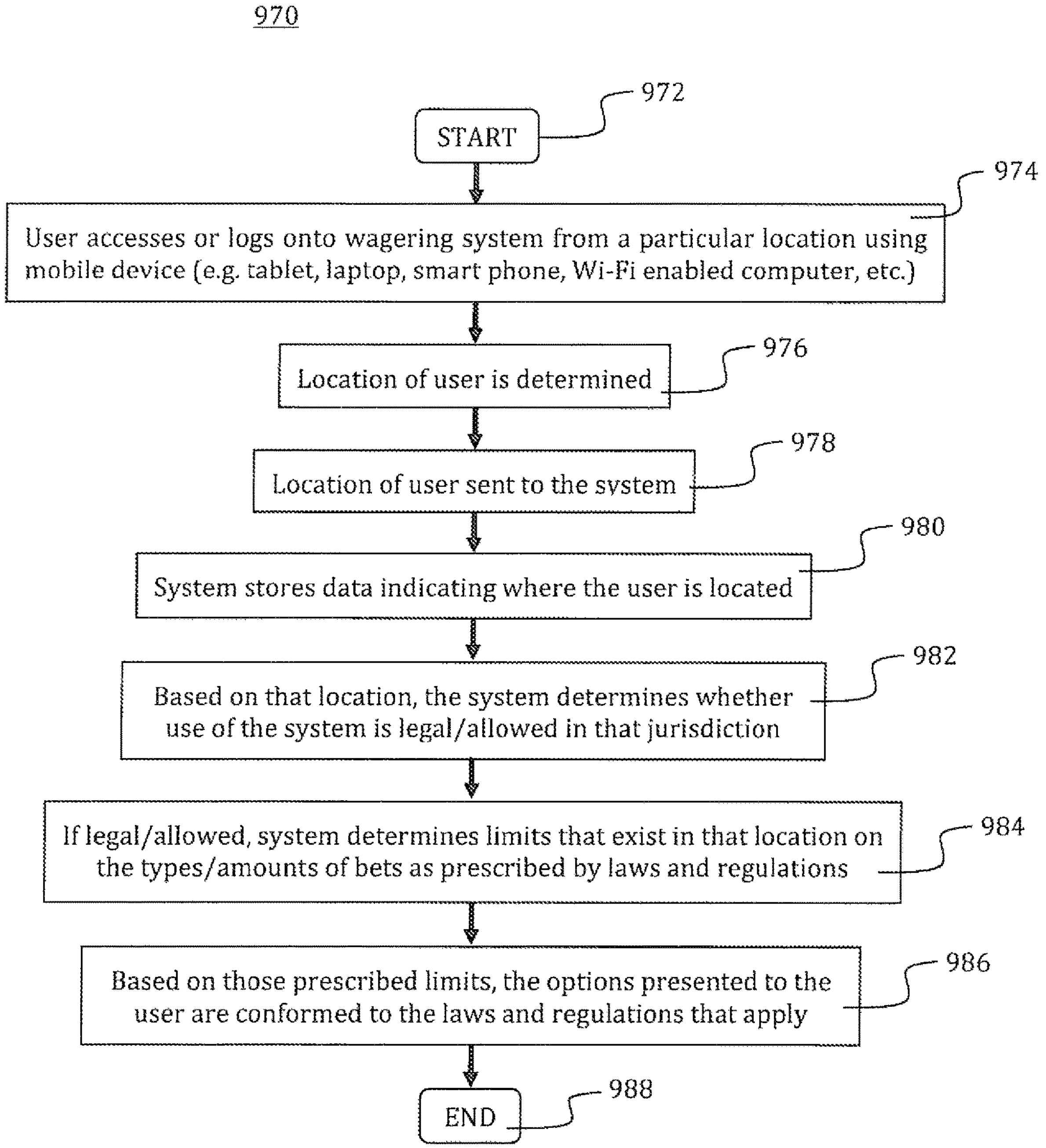
FIG. 14 illustrates a high-level flow chart of operations depicting logical operational steps of a method for location-based wagering or betting, in accordance with another embodiment.

FIG. 14 illustrates a high-level flow chart of operations depicting logical operational steps of a method 970 for location-based wagering or betting, in accordance with another embodiment. It can be appreciated that the methods and operation steps/features shown in FIGS. 14-17 herein can be implemented via a wagering or betting system such as system 100, and that such operations are not limited to micro-gaming or micro-betting but can apply to general wagering and betting applications. Such operations can be implemented in the context of, for example, the betting module 122, authentication module 124, tracking modules 126, the location-based module 155, etc., depicted in FIG. 1. Such operations are preferably implemented in the context of a mobile device and in particular a mobile "app". The modules 122, 124, 126, 155 etc., can be implemented in the context of application programs 154, which may be in some embodiments a mobile "app".

As shown at block 972, the process or method 970 can be initiated. As indicated beginning at block 974, steps or logical operations can be implemented in the context of a location detection based system or application (e.g., GPS, transponder, triangularization, etc.), wherein when a user logs onto or accesses the system from a particular location using a mobile device (e.g., tablet, laptop, smart phone, Wi-Fi enabled computer, etc.), the location of the user is determined, as shown at block 976, and this location data is then sent to the system as depicted at block 978 so that the system "knows" where the user is located. The system can store data indicating where the user is located, as indicated at block 980. Storage of such data can take place via, for example, a memory such as memory 136 and/or other locations such as a networked server such as, for example, servers 240, 245 and so forth as shown in FIG. 2. Based on that location, a step or logical operation can be implemented in which the system or application (e.g., "app") determines, as described at block 982, whether use of the system or application is legal/allowed in that jurisdiction. if legal/allowed, a step or logical operation can be implemented in which the system or application determines the limits that exist in that location regarding the types/amounts of bets as prescribed by laws and regulations, as illustrated at block 984. Thereafter, as shown at block 986, a step or logical operation can be implemented in which, based on those prescribed limits, the options presented to the user via, for example, the mobile device via the application or mobile "app" are conformed to the laws and regulations that apply. The process can then terminate, as shown at block 988.

Figure 15:
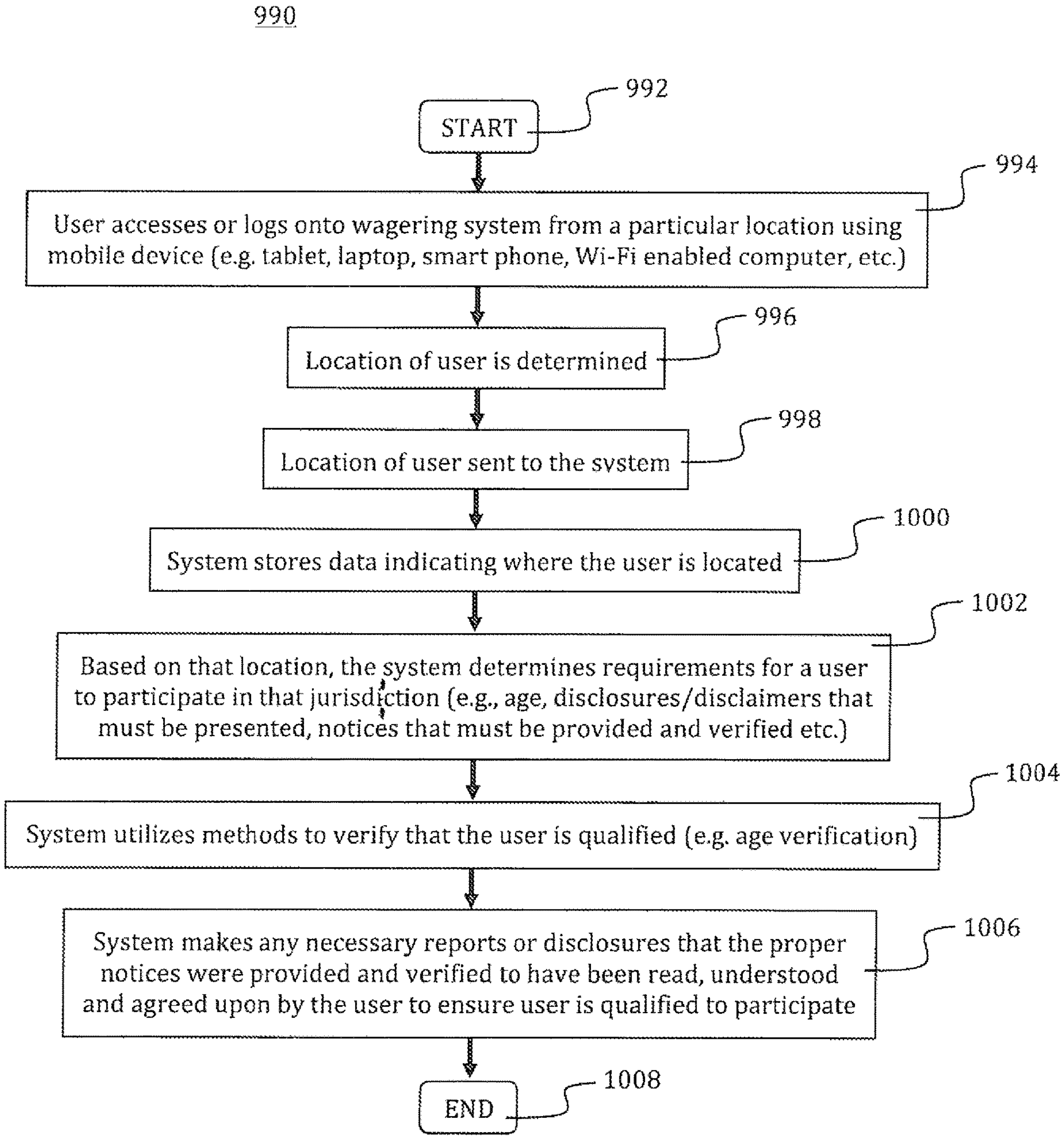
FIG. 15 illustrates a high-level flow chart of operations depicting logical operational steps of a method for locating-based wagering or betting, in accordance with another embodiment.

FIG. 15 illustrates a high-level flow chart of operations depicting location operational steps of a method 990 for locating-based wagering or betting, in accordance with another embodiment. As shown at block 992, the process or method 990 can be initiated. As indicated beginning at block 994, steps or logical operations can be implemented in the context of a location detection based system or application (e.g., GPS, transponder, triangularization, etc.), wherein when a user logs onto or accesses the system from a particular location using a mobile device (e.g., tablet, laptop, smart phone, Wi-Fi enabled computer, etc.), the location of the user is determined, as shown at block 996, and this location data is then sent to the system as depicted at block 998 so that the system "knows" where the user is located. The system can store data indicating where the user is located, as indicated at block 1000. Storage of such data can take place via, for example, a memory such as memory 136 and/or other locations such as a networked server such as, for example, servers 240, 245 and so forth as shown in FIG. 2.

Based on that location, the system or "app" can determine or will already "know", as indicated by the step or logical operation shown at block 1002, the requirements for a user to participate in that jurisdiction (e.g., age, disclosures/disclaimers that must be presented, notices that must be provided and verified etc. As indicated at block 1004, a step or logical operation can be implemented to utilize methods to verify that the user is qualified (e.g., age verification). Then, as depicted at block 1006, a step or logical operation can be implemented to make any necessary reports or disclosures that the proper notices were provided and verified to have been read, understood and agreed upon by the user to ensure a user is qualified to participate. The process can then terminate, as shown at block 1008.

Figure 16:
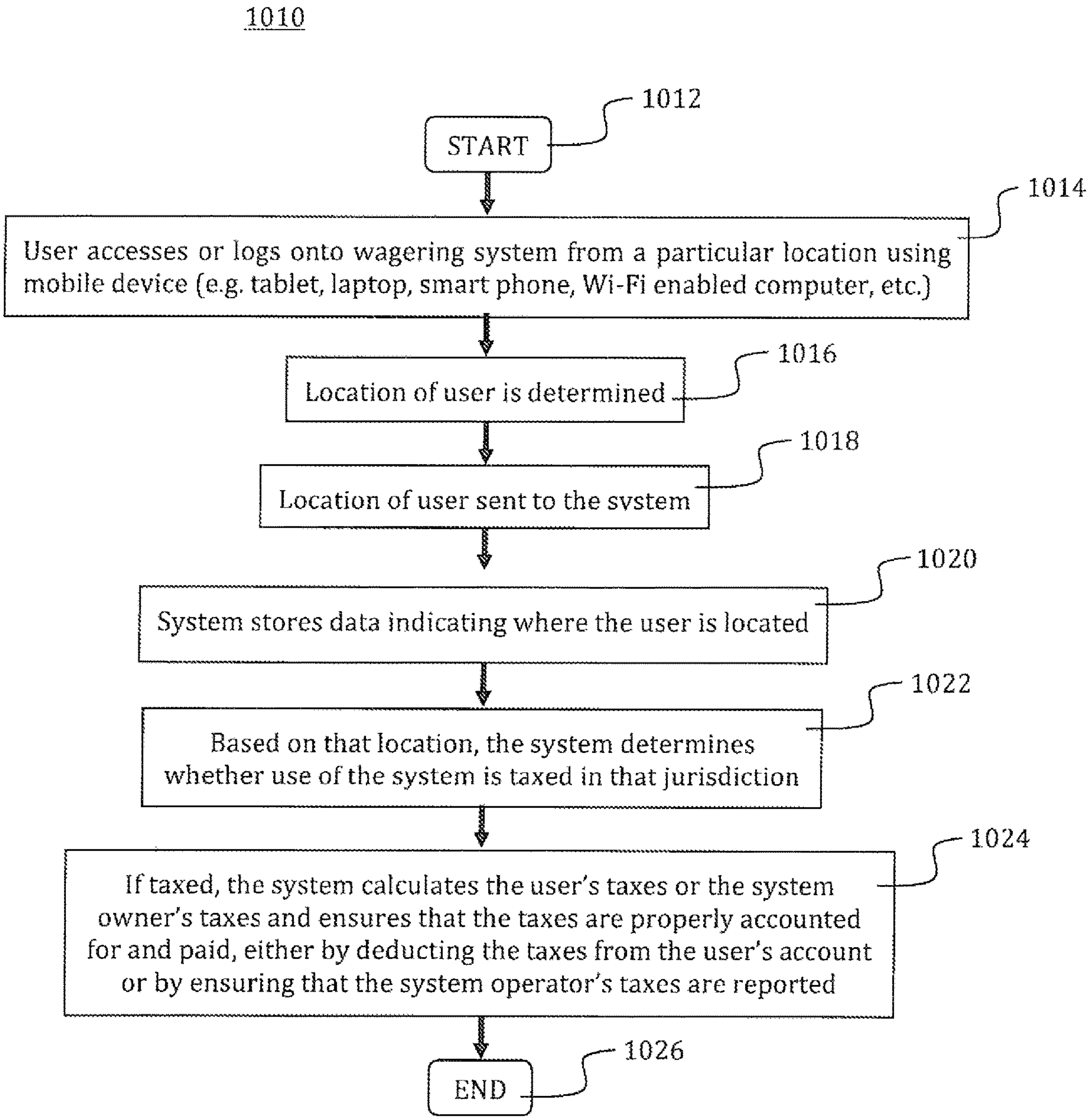
FIG. 16 illustrates a high-level flow chart of operations depicting logical operational steps of a method for locating-based wagering or betting, in accordance with another embodiment.

FIG. 16 illustrates a high-level flow chart of operations depicting location operational steps of a method 1010 for locating-based wagering or betting, in accordance with another embodiment. As shown at block 1012, the process or method 1010 can be initiated. As indicated beginning at block 1014, steps or logical operations can be implemented in the context of a location detection based system or application (e.g., GPS, transponder, triangularization, etc.), wherein when a user logs onto or accesses the system from a particular location using a mobile device (e.g., tablet, laptop, smart phone, Wi-Fi enabled computer, etc.), the location of the user is determined, as shown at block 1016, and this location data is then sent to the system as depicted at block 1018 so that the system "knows" where the user is located. The system can store data indicating where the user is located, as indicated at block 1020. Storage of such data can take place via, for example, a memory such as memory 136 and/or other locations such as a networked server such as, for example, servers 240, 245 and so forth as shown in FIG. 2.

Based on the determined location, the system can then determine, as shown at block 1022, whether use of that system or application is taxable in that jurisdiction (i.e., the local state, province, county, city, etc., associated with the determined location). If taxable, then as shown at block 1024, a step or logical operation can be implemented in which the system calculates the user's taxes and/or the system owner's taxes and ensures that such taxes are properly accounted for and paid, either by deducting the taxes from the user's account or ensuring that the system operator's taxes are reported. The process can then terminate, as depicted at block 1026.

Figure 17:
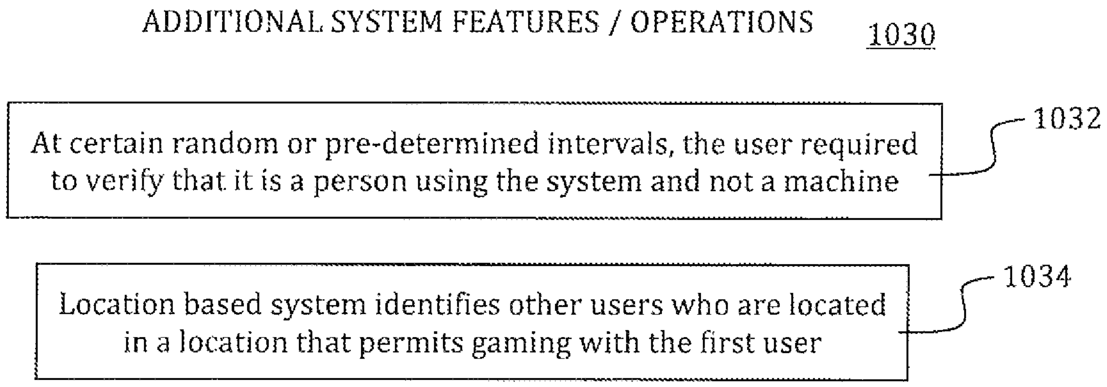
FIG. 17 illustrates a block diagram depicting additional features or operations for locating-based wagering or betting, in accordance with another embodiment.

FIG. 17 illustrates a block diagram depicting additional features or operations 1030 for locating-based wagering or betting, in accordance with another embodiment. Note that the operations shown in FIG. 17 can be implemented as individual embodiments or in the context of the other embodiments and methods/systems discussed herein. Block 1032 depicts a step or logical operation or system feature, wherein at certain random or pre-determined intervals, the user is required to verify that it is a person using the system and not a machine. Block 1034 illustrates a step or logical operation or system feature, in which the GPS or other location based system/app can be used to identify other users who are located in a location that permits gaming with the first user. For example, if the first user initiates a parimutuel betting game within a venue, but gaming is only permitted inside the venue, the GPS-based or other location detection-based system, can be employed to identify other users located within the venue who could participate in that game.

Figure 18:
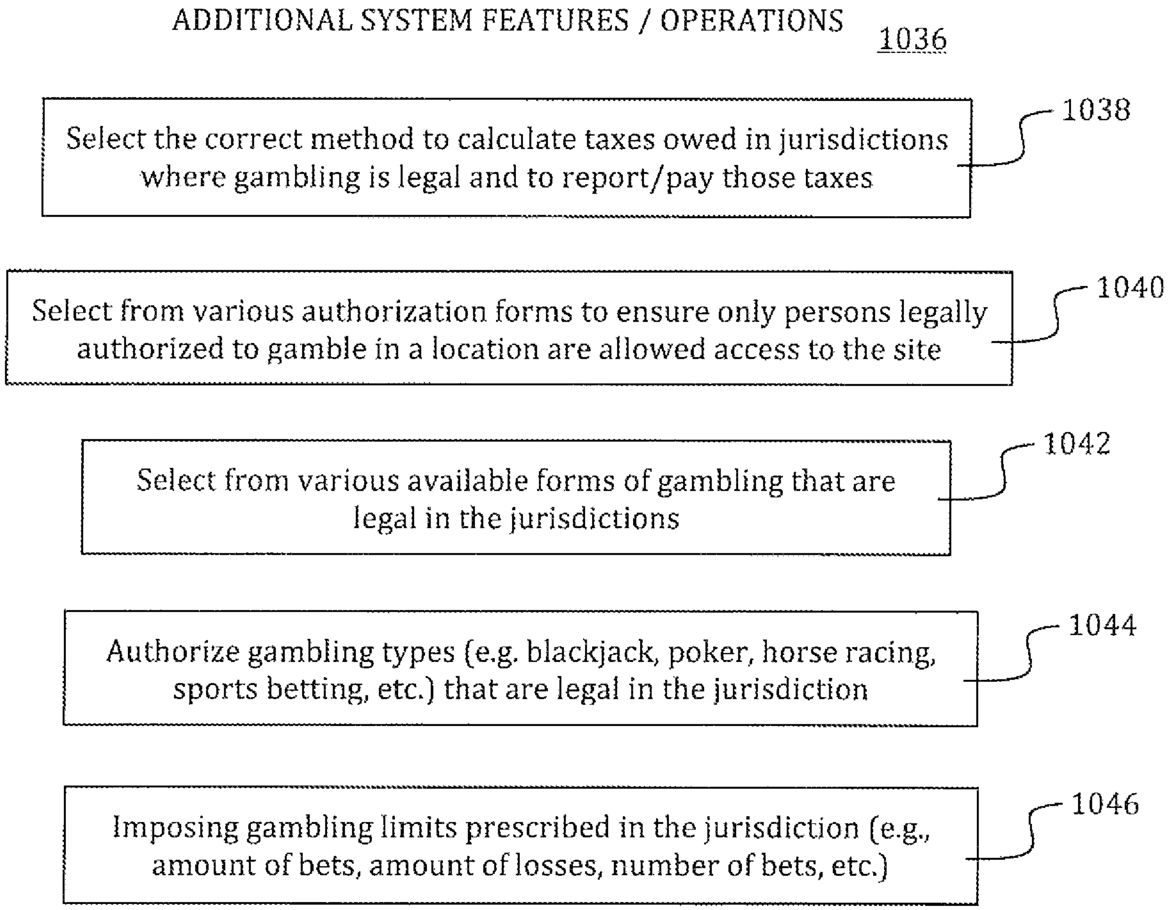
FIG. 18 illustrates a block diagram depicting additional features or operations for locating-based wagering or betting, in accordance with an alternative embodiment.

FIG. 18 illustrates a block diagram depicting additional features or operations 1036 for locating-based wagering or betting, in accordance with another embodiment. Note that the operations shown in FIG. 18 can be implemented as individual embodiments or in the context of the other embodiments and methods/systems discussed herein. As a reminder, the disclosed embodiments, can apply to any form of online gaming/wagering/betting using mobile devices, not just micro-betting or micro-gaming. A shown at block 1038, a GPS or other location-based system can be used to select the correct method to calculate taxes owed in jurisdictions where gambling is legal and to report/pay those taxes. As described at block 1040, the GPS or other location-based system can select from various authorization forms to ensure only persons legally authorized to gamble in a location are allowed access to the site. As illustrated at block 1042, the GPS or other location-based system can select from various available forms of gambling that are legal in the jurisdictions. As indicated at block 1044, the GPS or other location based system or service can be employed to authorize gambling types (e.g., blackjack, poker, horse racing, sports betting, etc.) that are legal in the jurisdiction. Additionally, as shown at block 1045, a step or logical operation can be implemented for imposing the gambling limits prescribed in the jurisdiction (e.g., amount of bets, amount of losses, number of bets, etc.).

Also that various presently unforeseen or unanticipated alternatives, modifications, variations or improvements therein may be subsequently made by those skilled in the art which are also intended to be encompassed by the following claims.

What is claimed is:

1. A computer-implemented method for location-based wagering, the method performed by a computer system having one or more processors and memory storing one or more programs for execution by the one or more processors, the computer-implemented method comprising:

invoking an online wagering service via a mobile device having a video display screen that supports viewing of a macro-event activity and micro-event gaming data on the video display screen, the online wagering service including a micro-betting graphical user interface (GUI) and a control function that sets when a micro-betting opportunity begins and when the micro-betting opportunity ends;

determining a location of the mobile device;

authorizing the mobile device access to the online wagering service based on the location of the mobile device, wherein the micro-event gaming data comprises a micro-bet or a group of micro-bets;

processing a test to determine whether a selection of a micro-bet or a group of micro-bets is made by a user, wherein, upon determining that the selection of the micro-bet or the group of micro-bets made, entering and processing the micro-bet or the group of micro-bets via a server, wherein, upon determining that the selection has not been made, offering one or more additional new micro-bets associated with a particular micro-outcome for selection by the user; and generating a result of the processed micro-bet or the group of micro-bets to the user.

2. The computer-implemented method of claim 1 wherein the video display screen comprises a touch screen interface that displays the micro-betting GUI.

3. The computer-implemented method of claim 1 further comprising displaying the macro-event activity in the micro-betting GUI within the video display screen as macro-event video simultaneously with a display of the micro-event gaming data.

4. The computer-implemented method of claim 3 wherein the micro event gaming data comprises micro-bet wagering data.

5. The computer-implemented method of claim 3 wherein the micro-bet wagering data includes at least one of: tallies of micro-bets, histories of micro-bets, and pending micro-bets.

6. The computer-implemented method of claim 1 wherein the video display screen displays a picture-in-picture display that enables simultaneous viewing of disparate data including the macro-event activity and the micro-event gaming data.

7. The computer-implemented method of claim 1 further comprising displaying wagering input fields for the online wagering service in the display screen.

8. The computer-implemented method of claim 1 further comprising displaying the micro-event gaming data on the video display screen in a live video feed in the GUI.

9. The computer-implemented method of claim 1 further comprising displaying the micro-event gaming data on the video display screen in a video replay in the GUI.

10. The computer-implemented method of claim 1 further comprising determining when a selection of the micro-bet or the group of micro-bets has been made.

11. The computer-implemented method of claim 10 when the selection of the micro-bet or the group of micro-bets has been made, automatically entering the micro-bet or the group of micro-bets as a wager.

* * * * *